US011632277B2

(12) United States Patent
Shellhammer et al.

(10) Patent No.: US 11,632,277 B2
(45) Date of Patent: Apr. 18, 2023

(54) MULTI-GENERATION COMMUNICATION IN A WIRELESS LOCAL AREA NETWORK (WLAN)

(71) Applicant: QUALCOMM Incorporated, San Diego, CA (US)

(72) Inventors: Stephen Jay Shellhammer, Ramona, CA (US); Bin Tian, San Diego, CA (US); Sameer Vermani, San Diego, CA (US); Jialing Li Chen, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/320,221

(22) Filed: May 14, 2021

(65) Prior Publication Data

US 2021/0359885 A1 Nov. 18, 2021

Related U.S. Application Data

(60) Provisional application No. 63/025,150, filed on May 14, 2020.

(51) Int. Cl.
*H04L 12/28* (2006.01)
*H04L 27/26* (2006.01)
*H04W 84/12* (2009.01)

(52) U.S. Cl.
CPC ...... *H04L 27/2603* (2021.01); *H04L 27/2621* (2013.01); *H04W 84/12* (2013.01)

(58) Field of Classification Search
CPC .................................................. H04L 12/28
(Continued)

(56) References Cited

U.S. PATENT DOCUMENTS

2016/0057657 A1 2/2016 Seok
2017/0238304 A1 8/2017 Ling et al.
(Continued)

FOREIGN PATENT DOCUMENTS

WO 2016170505 10/2016
WO 2018152224 8/2018
(Continued)

OTHER PUBLICATIONS

"802 11 Working Group of the LAN/MAN Standards Committee of the IEEE Computer Society: IEEE Draft; Draft P802.11AX D5", IEEE-SA, Piscataway, NJ USA, vol. 802.11ax drafts, No. D5.1, Nov. 6, 2019, 770 pages.
(Continued)

*Primary Examiner* — Dang T Ton
(74) *Attorney, Agent, or Firm* — Holland & Hart LLP

(57) ABSTRACT

This disclosure provides methods, devices and systems for wireless communication, and particularly, for generating or receiving a multi-generation physical layer protocol data unit (PPDU). The multi-generation PPDU may concurrently include a first generation-specific preamble based on a first generation of a wireless communication specification (such as that defined by the Institute of Electrical and Electronics Engineers (IEEE) 802.11 family of standards) and a second generation-specific preamble based on a second generation of the wireless communication specification in a same transmission. The generation-specific preambles may be generated based on bandwidth portions of a wireless channel that each generation-specific preamble will occupy in the multi-generation PPDU. One or more of the generation-specific preambles may be modified based on an aggregate bandwidth of the multi-generation PPDU. This disclosure includes several options for modifying one or more genera-
(Continued)

tion-specific preambles or data fields to accommodate their use in a multi-generation PPDU.

32 Claims, 26 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0097850 | A1 | 3/2019 | Kenney et al. |
| 2019/0289612 | A1 | 9/2019 | Chen et al. |
| 2021/0273757 | A1 | 9/2021 | Shellhammer et al. |
| 2021/0297209 | A1 | 9/2021 | Shellhammer et al. |
| 2021/0359885 | A1* | 11/2021 | Shellhammer ...... H04L 27/2614 |

FOREIGN PATENT DOCUMENTS

| | | |
|---|---|---|
| WO | 2019240792 | 12/2019 |
| WO | 2019240955 | 12/2019 |
| WO | 2021030234 | 2/2021 |
| WO | 2021173484 | 9/2021 |
| WO | 2021195021 | 9/2021 |

OTHER PUBLICATIONS

"PCT Application No. PCT/US2021/019023 International Search Report and Written Opinion", Jun. 21, 2021, 10 pages.
"PCT Application No. PCT/US2021/023581 International Search Report and Written Opinion", Jun. 25, 2021, 12 pages.
"PCT Application No. PCT/US2021/032439 International Search Report and Written Opinion", Aug. 5, 2021, 17 pages.
Cailian, et al., "IEEE 802.11be Wi-Fi7: New Challenges and Opportunities", IEEE Communications Surveys and Tutorials, IEEE, USA, vol. 22, No. 4, Jul. 29, 2020, pp. 2136-2166.
Cao, et al., "Aggregated PPDU for Large BW", IEEE Draft; 11-20-0693-00-00BE-AGGREGATED-PPDU-FOR-LARGE-BW, IEEE-SA Mentor, Piscataway, NJ USA, vol. 802 .11 EHT; 802.11be, May 2, 2020, 7 pages.
Chen, et al., "Design of Forward Compatible OFDMA", Dec. 28, 2019, 10 pages.
Choi, "View on EHT Objectives and Technologies", IEEE Draft 802.11-18/1171R0, IEEE-SA Mentor, Piscataway, NJ USA,, Jul. 8, 2018, 13 pages.
Evgeny, et al., "Current Status and Directions of IEEE 802.11be, the Future Wi-Fi 7", IEEE Access, IEEE, USA, vol. 8, May 7, 2020, pp. 88664-88688.
Liu, et al., "Efficient EHT Preamble Design", IEEE Draft; 11-20-0439-00-00BE-EFFICIENT-EHT-PREAMBLE-DESIGN, IEEE-SA Mentor, Piscataway, NJ USA, vol. 802.11 EHT, 802.11 be, 13, Nov. 18, 2019, 10 pages.
Noh, "20 MHz transmission in NGV", IEEE Draft; 11-19-1154-00-00BD-20-MHZ-TRANSMISSION-INNGV, IEEE-SA Mentor, Piscataway, NJ USA, vol. 802.11 NGV;802.11bd, Jul. 14, 2019, 15 pages.
Park, et al., "Consideration on 320MHz Bandwidth and 16 Spatial Streams", 11-19-0778-00-00BE-CONSIDERATION-ON-320MHZ-BANDWIDTH-AND-16-SPATIAL-STREAMS, IEEE-SA Mentor, Piscataway, NJ USA, vol. 802.11 EHT; 802.11be, May 13, 2019, 27 pages.
Park, et al., "Phase Rotation Proposal", IEEE Draft; 11-20-0406-00-00BE-PHASE-ROTATION-PROPOSAL; IEEE-SA Mentor, Piscataway, NJ USA, vol. 802.11 EHT; 802.11be, Mar. 16, 2020, 11 pages.

* cited by examiner

MULTI-GENERATION COMMUNICATION IN A WIRELESS LOCAL AREA NETWORK (WLAN)

CROSS-REFERENCE TO RELATED APPLICATIONS

This Patent Applications claims priority to U.S. Provisional Patent Application No. 63/025,150, filed May 14, 2020, entitled "WIRELESS PACKET FORMAT FOR MULTI-GENERATION COMMUNICATION IN A WIRELESS LOCAL AREA NETWORK (WLAN)," and assigned to the assignee hereof. The disclosure of the prior Application is considered part of and is incorporated by reference in this Patent Application.

TECHNICAL FIELD

This disclosure relates generally to wireless communication, and more specifically, to multi-generation communication in a wireless local area network (WLAN).

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

The IEEE 802.11 family of standards define communication protocols collectively referred to as a wireless communication specification. Some amendments to the IEEE 802.11 standard may define new physical layer (PHY) specifications and may be referred to as a new generation of the IEEE 802.11 family of standards. For example, the IEEE 802.11ax and IEEE 802.11be amendments to the IEEE 802.11 standard may be considered different generations of the wireless communication specification embodied in the broader IEEE 802.11 family of standards. New generations of the communication specification are continually created in an ongoing cycle of development. Each generation of the wireless communication specification may enable greater bandwidth or enhanced features compared to previous generations.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication in a wireless local area network (WLAN). The method may include generating a first generation-specific preamble formatted according to a first generation of a wireless communication specification based on a first bandwidth of a first subchannel of the wireless channel. The method may include generating a second generation-specific preamble formatted according to a second generation of the wireless communication specification based on a second bandwidth of a second subchannel of the wireless channel. The method may include generating a multi-generation physical layer protocol data unit (PPDU) that concurrently includes the first generation-specific preamble in the first subchannel and the second generation-specific preamble in the second subchannel. The method may include modifying at least the first generation-specific preamble or the second generation-specific preamble based on an aggregate bandwidth of the multi-generation PPDU. The method may include transmitting the multi-generation PPDU via the wireless channel.

Another innovative aspect of the subject matter described in this disclosure can be implemented in an apparatus for wireless communication in a WLAN. The apparatus may include at least one processor configured to generate a first generation-specific preamble formatted according to a first generation of a wireless communication specification based on a first bandwidth of a first subchannel of the wireless channel. The at least one processor may be configured to generate a second generation-specific preamble formatted according to a second generation of the wireless communication specification based on a second bandwidth of a second subchannel of the wireless channel. The at least one processor may be configured to generate a multi-generation physical layer protocol data unit (PPDU) that concurrently includes the first generation-specific preamble in the first subchannel and the second generation-specific preamble in the second subchannel. The at least one processor may be configured to modify at least the first generation-specific preamble or the second generation-specific preamble based on an aggregate bandwidth of the multi-generation PPDU. The apparatus may include at least one modem configured to output the multi-generation PPDU for transmission via the wireless channel.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
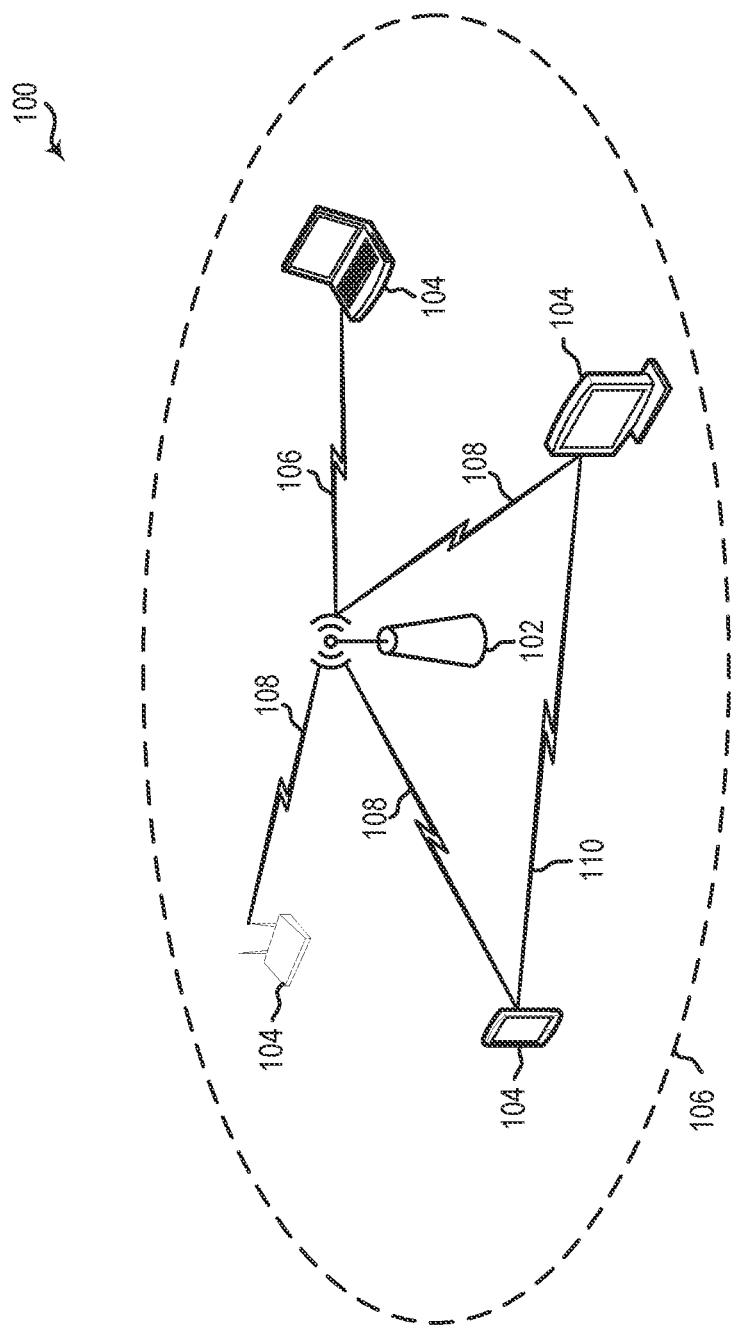
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to formats, structures, and techniques for generating or receiving a multi-generation physical layer protocol data unit (PPDU). The multi-generation PPDU may concurrently include a first generation-specific preamble based on a first generation of a wireless communication specification (such as the IEEE 802.11 standard) and a second generation-specific preamble based on a second generation of the wireless communication specification in a same transmission. A generation of the IEEE 802.11 standard may refer to an amendment that modifies the physical layer (PHY) or defines additional wireless channel bandwidth options associated with WLAN communication. Examples of different generations may include the IEEE 802.11ax amendment, the IEEE 802.11be amendment, and a future amendment, among other examples. In some implementations, the generations may be referred to as PHY generations or may be numbered (such as 4G, 5G, and 6G, among other examples). In some aspects, a multi-generation PPDU may support two or more generations of the IEEE 802.11 standard and may concurrently include generation-specific preambles for the different generations in different respective subchannels of the wireless channel. The multi-generation PPDU also may include a single data field that spans the entire bandwidth of the multi-generation PPDU or may include different data fields in the respective subchannels.

A multi-generation PPDU may be formed from two or more sub-PPDUs (which also may be referred to as subchannel PPDUs or component PPDUs), each of which occupy different subchannels and are formatted according to different generations. Each sub-PPDU may include a generation-specific preamble and a respective data field such that it can be processed as a standalone PPDU even though it transmitted concurrently with other sub-PPDUs on different subchannels. In this configuration, the multi-generation PPDU may be referred to as a compound PPDU. Each sub-PPDU may include a generation-specific preamble that is initially generated based on a bandwidth of a subchannel that the generation-specific preamble will occupy in the multi-generation PPDU. Specifically, an access point (AP) may initially generate each sub-PPDU (including the respective generation-specific preambles) using a particular format governed by a respective generation of the wireless communication specification based on a bandwidth of the sub-channel that will carry the sub-PPDU (as opposed to an aggregate bandwidth of the multi-generation PPDU). The respective generation of the wireless communication specification may define parameters (such as phase shifts, cyclic shift diversity (CSD), tone plans, short training field (STF) sequences, long training field (LTF) sequences, among other examples) that are specific to particular bandwidths of a PPDU. However, such parameters may be less optimal when multiple sub-PPDUs are combined to form a multi-generation PPDU. In accordance with this disclosure, one or more portions of the sub-PPDUs may be modified to accommodate their use in a multi-generation PPDU. For example, one or more generation-specific preambles may be modified based on an aggregate bandwidth of the multi-generation PPDU.

This disclosure provides several techniques to adjust or modify one or more of the generation-specific preambles for use in a multi-generation PPDU. Some techniques include the use of phase rotations, OFDM symbol alignment, selecting a particular long training field (LTF) sequence and short training field (STF) sequence, modifying values in bandwidth fields of the generation-specific preambles, use of custom tone plans or RU allocation tables, among other examples. Other examples include changes to CSD, tone plans, and restricted RU assignments, among other examples. In some implementations, an AP may reduce the overall PAPR of the multi-generation PPDU by applying a phase shift rotation to one or more of the generation-specific preambles. In scenarios in which a particular generation already defines a phase rotation scheme associated with portions of the generation-specific preamble in one subchannel, the AP may determine a phase rotation for a generation-specific preamble in another subchannel based on a phase rotation of the closest adjacent portion of the adjacent generation-specific preamble. In some implementations, an AP may modify one or more generation-specific preambles to ensure preamble and OFDM symbol alignment of the generation-specific preambles within the multi-generation PPDU.

Particular implementations of the subject matter described in this disclosure can be implemented to realize one or more of the following potential advantages. As described initially above, the multi-generation PPDUs presented herein can support simultaneous communication to or from stations (STAs) that implement different generations of the IEEE 802.11 family of standards. As the IEEE 802.11 standard evolves to expand the channel bandwidth or to add other features in new generations, the multi-generation PPDUs may enable communications formatted according to previous generations while concurrently supporting communications formatted using the new generations. The formats and modifications provided in this disclosure may reduce an overall PAPR of the preamble portion of a multi-generation PPDU.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one generation of the IEEE 802.11 family of standards (such as that defined by the IEEE 802.11-2016 standard or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 standard or amendments thereof including, but not limited to, 802.11ah, 802.11ad, 802.11ay, 802.11ax, 802.11az, 802.11ba and 802.11be). These IEEE 802.11 family of standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax specification amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular PHY generation of the IEEE 802.11 standard to be used to transmit the payload.

Figure 2:
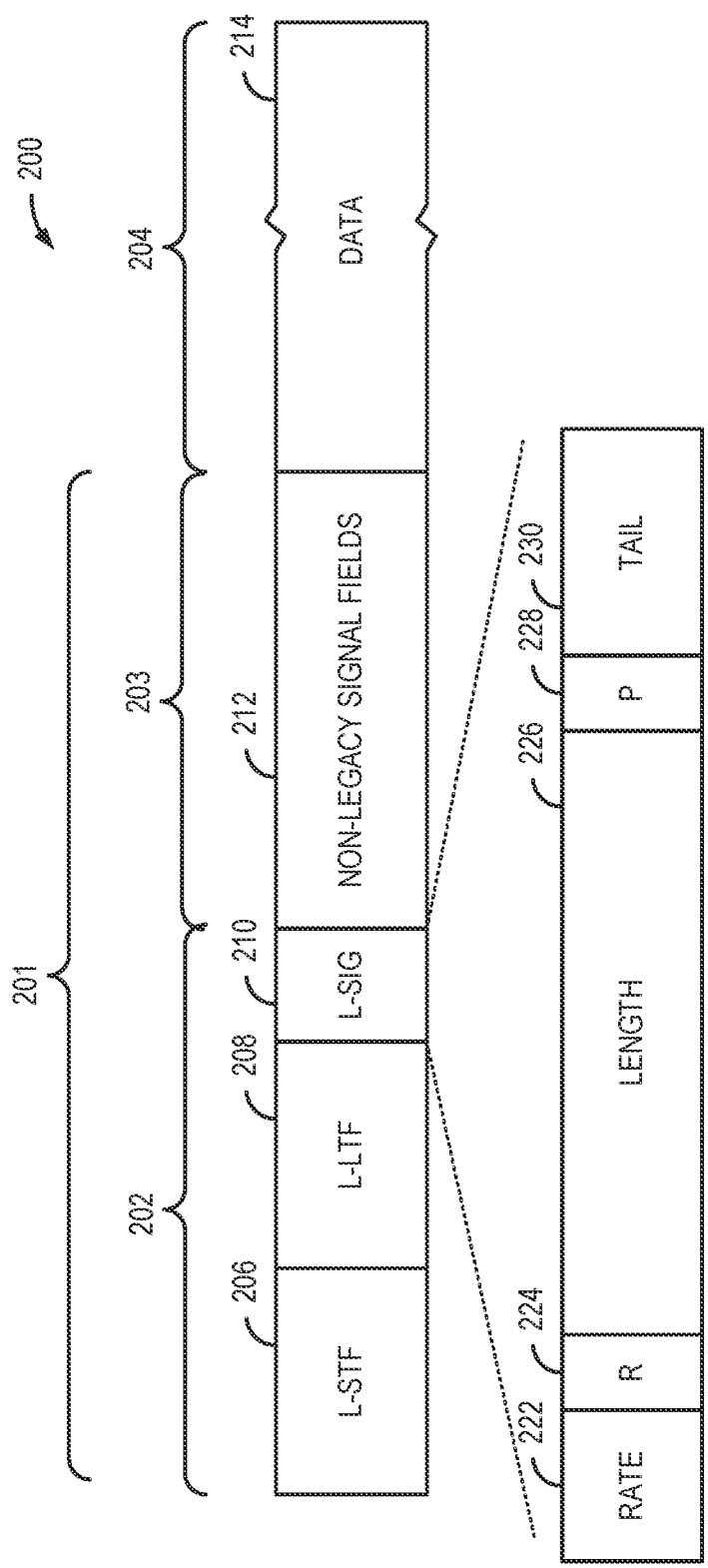
FIG. 2 shows an example physical layer convergence protocol (PLCP) protocol data unit (PPDU) usable for communications between an access point (AP) and a number of stations (STAs).

FIG. 2 shows an example PPDU) 200 usable for wireless communication between an AP and a number of STAs. As shown, the PPDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a specification.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PPDU and to use the determined duration to avoid transmitting on top of the PPDU. For example, the L-STF 206, the L-LTF 208 and the L-SIG 210 may be modulated according to a binary phase shift keying (BPSK) modulation scheme. FIG. 2 shows an example L-SIG 210 in the PPDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

The preamble 201 may also include a second portion 203 including one or more non-legacy signal fields 212, for example, conforming to an IEEE 802.11 family of standards such as the IEEE 802.11ac, 802.11ax, 802.11be or later generations. In some implementations, the second portion 203 of the preamble 201 may include a repeat of the L-SIG (RL-SIG, not shown) before the non-legacy signal fields 212. To accommodate later generations of the wireless communication specification defined by the IEEE 802.11 family of standards, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. However, such a solution may not be scalable, and the redefined or overloaded L-SIG fields may become saturated as more generations are developed. As described further in this disclosure, the non-legacy signal fields 212 may include a universal signal field (U-SIG, not shown) that is constructed to indicate a type of PPDU, an indication of the generation (such as a PHY Version Indicator field) of the wireless communication specification associated with the PPDU, a bandwidth setting, puncturing, or any combination thereof.

Following the non-legacy signal fields 212, the PPDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3:
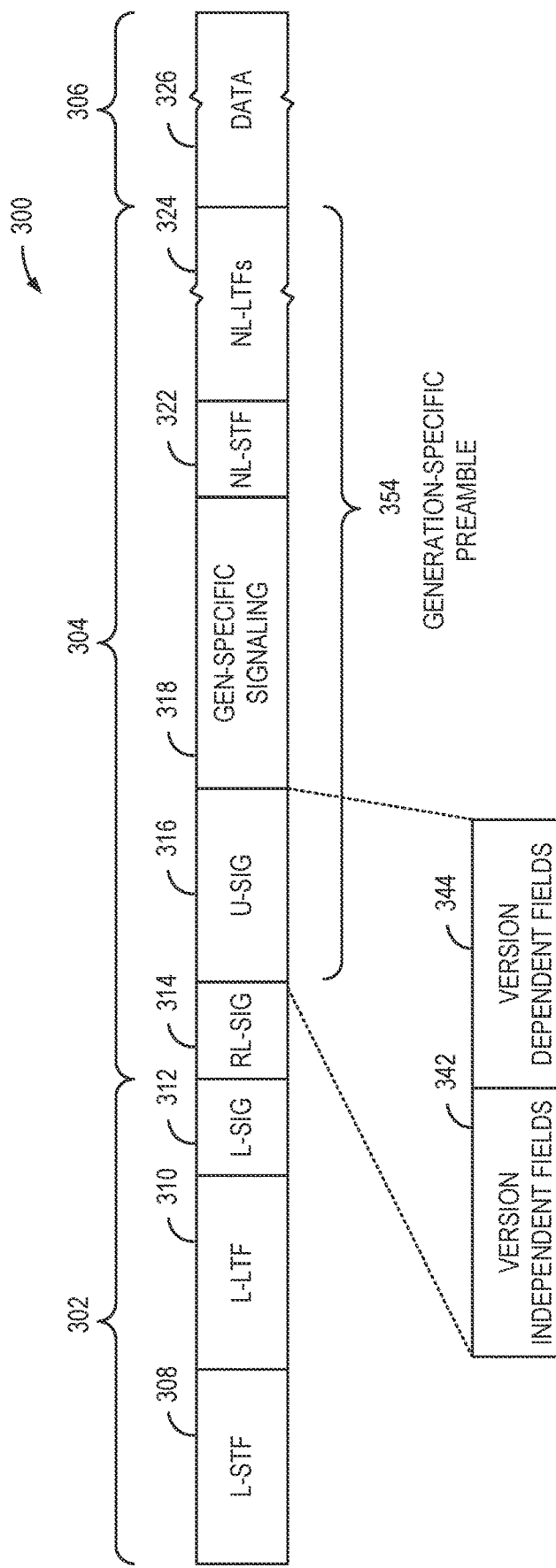
FIG. 3 shows an example PPDU that includes a universal signal field (U-SIG).

FIG. 3 shows an example PPDU that includes a U-SIG. For example, the PPDU 300 can be configured as a PPDU. The IEEE is expected to implement U-SIG 316 as part of the preamble for the IEEE 802.11be amendment to the IEEE 802.11 standard as well as for the preambles of future generations (for example, for subsequent amendments to the IEEE 802.11 standard). The U-SIG 316 may include version-independent fields and version-dependent fields. The version-independent fields may be commonly specified for multiple generations, for example, starting with 802.11be and going forward. Among other things, the U-SIG 316 may indicate a format of the PPDU, an indication of the generation (for example, the Extreme High Throughput (EHT) protocol defined in 802.11be), a subchannel bandwidth, puncturing, or any combination thereof. The version-dependent fields may depend on the generation of the wireless communication specification (for example, associated with a particular amendment to the IEEE 802.11 standard) used to format and otherwise generate the PPDU. The U-SIG 316 may be followed by generation-specific signaling 318. Together, the U-SIG 316 and generation-specific signaling 318 may be referred to collectively as a generation-specific preamble 354. The format of the generation-specific preamble 354 may differ based on the generation of the wireless communication specification. For example, the U-SIG 316 may precede generation-specific signaling 318 that is formatted as an EHT portion of the preamble in accordance with the IEEE 802.11be amendment to the IEEE 802.11 specification, or may be formatted as a preamble conforming to any later (post-EHT) generation such as a future generation of the wireless communication specification.

The PPDU 300 includes a PHY preamble including a first portion 302 and a second portion 304. The PPDU 300 may further include a PHY payload 306 after the preamble, for example, in the form of a PSDU including DATA field 326. The first portion 302 includes an L-STF 308, an L-LTF 310, and an L-SIG 312. The second portion 304 of the preamble includes a repeated legacy signal field (RL-SIG) 314. Following the RL-SIG 314, the second portion 304 of the preamble includes the U-SIG 316. Depending on the format of the PPDU, the PPDU 300 may include a generation-specific signal field, such as the generation-specific signaling field 318. The second portion 304 further includes an additional non-legacy short training field 322 (referred to herein as "NL-STF" although it may be structured as, and carry generation-dependent information for, other generations) and a number of additional non-legacy long training fields 324 (referred to herein as "NL-LTFs" although they may be structured as, and carry generation-dependent information for, other generations).

The U-SIG 316 may include version-independent fields 342 and version-dependent fields 344. Examples of the version-independent fields 342 may include a version identifier, an indication of whether the PPDU 300 is an uplink (UL) or a downlink (DL) PPDU, a BSS color, and a transmission opportunity (TxOP) duration, among other examples. The version identifier in the version-independent fields 342 may indicate a version (and associated format) for the version-dependent fields 344. In some implementations, the version-dependent fields 344 may indicate a PPDU format (such as in a format information field). The PPDU format may determine which other indicators are included in the version-dependent fields 344 as well as the format or contents of the rest of U-SIG 316 and the generation-specific signaling 318. For example, depending on the value of the PPDU format field in the version-dependent fields 344, the PPDU 300 may include different formats 372, 374, 376, or 378 for the generation-specific signaling 318. In some implementations, the generation-specific signaling 318 may include RU allocations, among other examples. The U-SIG 316 may be a two-symbol length followed by a variable length generation-specific signaling 318. In some implementations, the generation-specific signaling 318 has an adjustable MCS indicated by the U-SIG 316. In some implementations, U-SIG 316 may include PPDU bandwidth (BW) and punctured channel information. The PPDU BW and punctured channel information may be referred to collectively as frequency occupation indications. The frequency occupation indications may permit WLAN devices on the wireless channel to determine the utilization of the various parts of the wireless channel. For example, the frequency occupation information may be used to indicate puncturing of some subchannels.

Figure 4A:
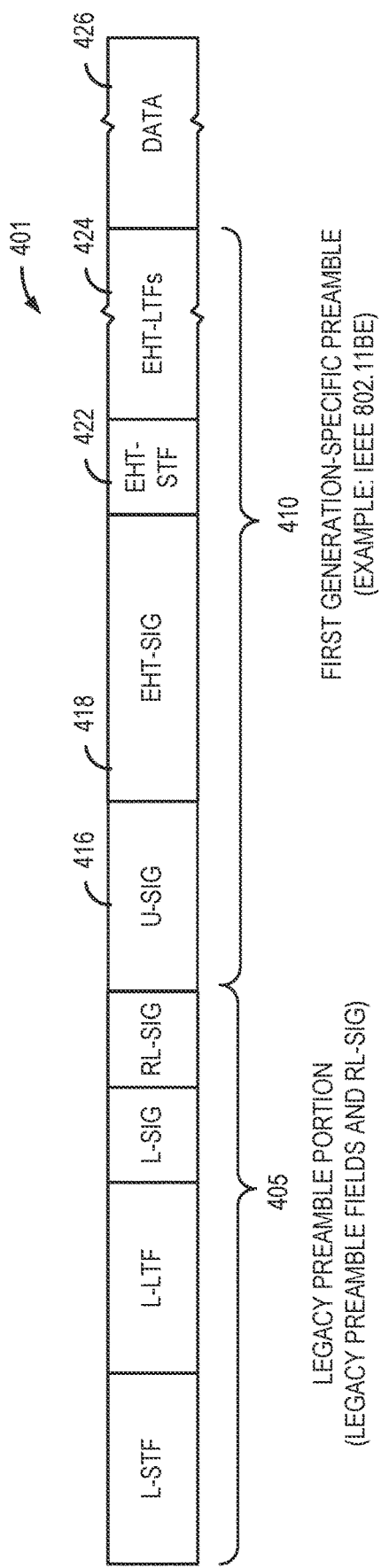
FIG. 4A shows an example PPDU with a first preamble based on a first generation of a wireless communication specification.

FIG. 4A shows an example PPDU with a first preamble based on a first generation of a wireless communication specification. For example, the PPDU 401 can be an example of a PPDU according to the IEEE 802.11be amendment to the IEEE 802.11 standard. The PPDU 401 includes the legacy preamble fields (L-STF, L-LTF, and L-SIG) and RL-SIG field as described with reference to FIG. 3. The legacy preamble fields, and RL-SIG may be referred to as a legacy preamble portion 405. Following the legacy preamble portion 405, the PPDU 401 includes a first preamble 410. The first preamble 410 may include a U-SIG 416 similar to the U-SIG 316 described with reference to FIG. 3. In some implementations, the U-SIG 416 may alter how the rest of the first preamble 410 is structured. For example, as described with reference to FIG. 3, the U-SIG may be followed by generation-specific signaling. In FIG. 4A, the generation-specific signaling is an EHT signal field (EHT-SIG) 418 field. For example, the U-SIG 416 may indicate a format of the EHT-SIG 418 in the various component channels, available channel bandwidths, and modulation and coding schemes (MCSs), among other possibilities. The EHT-SIG 418 may be used by an AP to identify and inform multiple STAs that the AP has scheduled UL or DL resources. The EHT-SIG 418 may be decoded by each compatible STA served by the AP. The EHT-SIG 418 may carry STA-specific scheduling information such as, for example, per-user MCS values and per-user RU allocation information. EHT-SIG 418 may generally be used by a receiving device to interpret bits in the DATA field 426. In some implementations, the EHT-SIG 418 includes a common field and at least one STA-specific ("user-specific") field. The common field can indicate RU distributions to multiple STAs, indicate the RU assignments in the frequency domain, indicate which RUs are allocated for MU-MIMO transmissions and which RUs correspond to MU-OFDMA transmissions, and the number of users in allocations, among other possibilities. The user-specific fields are assigned to particular STAs and may be used to schedule specific RUs and to indicate the scheduling to other WLAN devices. The common field may have a varying length. Each user-specific field may include multiple user block fields (which may be followed by padding). Each user block field may include, for example, two user fields that contain information for two respective STAs to decode their respective RU payloads. The first preamble 410 also may include an EHT short training field (EHT-STF) 422 and EHT long training field (EHT-LTF) 424.

Figure 4B:
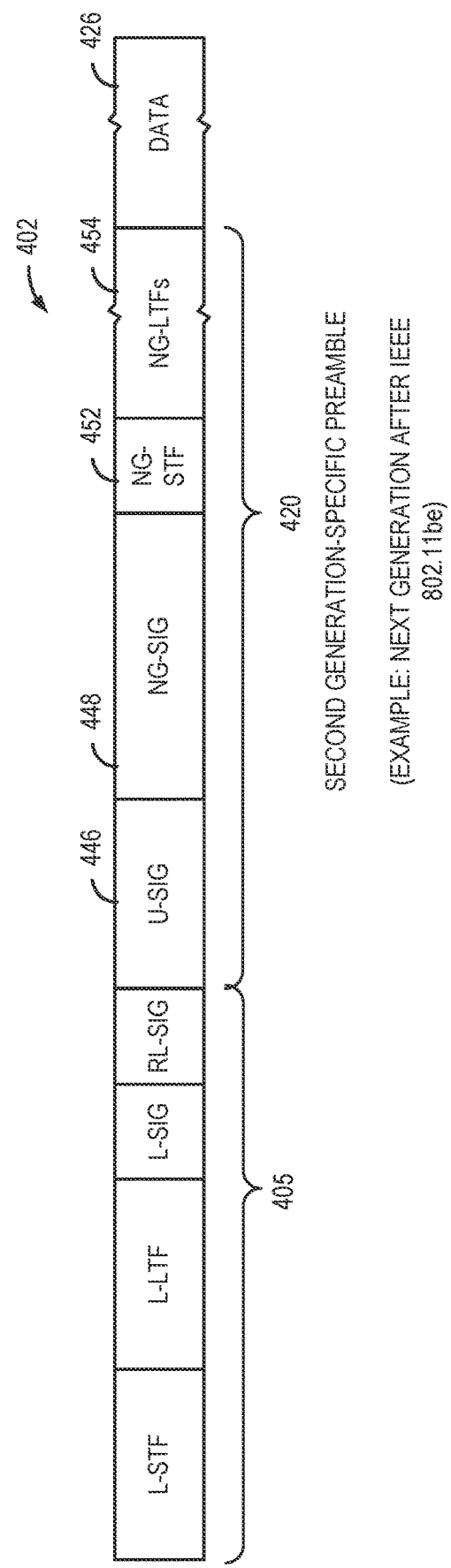
FIG. 4B shows an example PPDU with a second preamble based on a second generation of a wireless communication specification.

FIG. 4B shows an example PPDU with a second preamble based on a second generation of a wireless communication specification. By design, the PPDU 402 has a similar structure and size as the PPDU 401 described with reference to FIG. 4A. However, the PPDU 402 may be the format for a next generation of the wireless communication specification as defined by a new amendment to the IEEE 802.11 standard that may come after IEEE 802.11be. For brevity, the next generation may be referred to as next generation (NG). The PPDU 402 includes the legacy preamble portion 405 followed by a second preamble 420. The second preamble 420 includes a U-SIG 446 and generation-specific signaling. The generation-specific signaling may be formatted as a next generation signal field (NG-SIG) 448. The format and contents of the NG-SIG 448 may be different from the EHT-SIG 418 described with reference to FIG. 4A. In some implementations, the NG-SIG 448 includes RU allocation information indicating resources within the in the DATA field 426 that have been allocated to one or more STAs. The second preamble 420 also may include next generation short training field (NG-STF) 452 and next generation long training field (NG-LTF) 454.

PPDUs 401 and 402 in FIGS. 4A and 4B, respectively, have been described separately. However, as described in this disclosure, it may be possible to combine or merge them to form a multi-generation PPDU in accordance with implementations of this disclosure. In some implementations, the formats of the PPDUs 401 and 402 may be modified or adapted for use in a multi-generation PPDU. For example, one or both of the EHT-SIG 418 and NG-SIG 448 may be extended with padding symbols so that they are both the same length.

Figure 5:
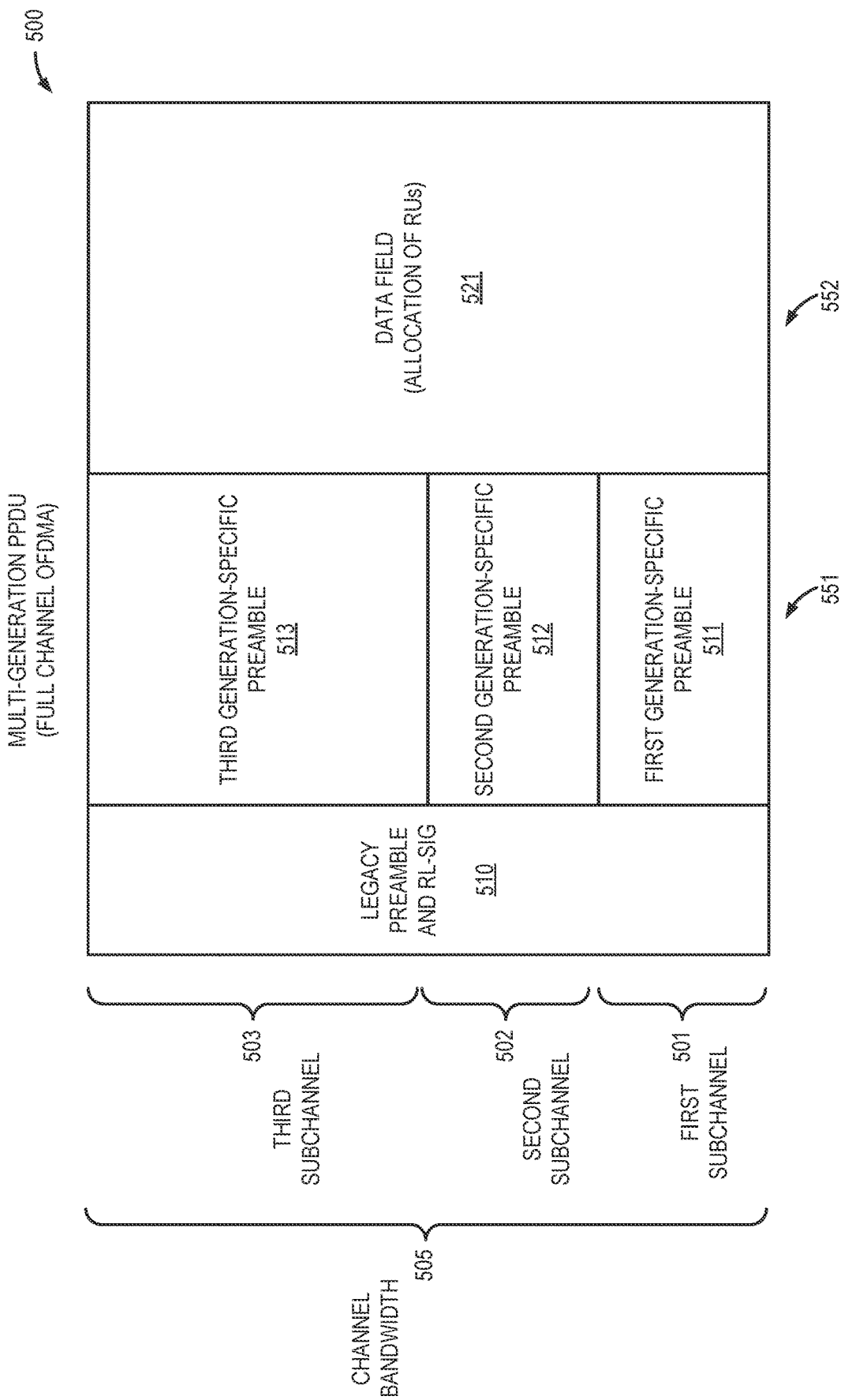
FIG. 5 shows an example multi-generation PPDU having generation-specific preambles based on different generations of a wireless communication specification according to some implementations.

FIG. 5 shows an example multi-generation PPDU 500 having generation-specific preambles based on different generations of a wireless communication specification according to some implementations. The multi-generation PPDU 500 may span the channel bandwidth 505 of a wireless channel. In the example of FIG. 5, the wireless channel may include a first subchannel 501, a second subchannel 502, and a third subchannel 503. In various implementations, the wireless channel may have a bandwidth that is greater than or equal to 320 MHz. In some such implementations, the generation-specific preambles may be signaled in subchannels that have a bandwidth size that is a multiple of 80 MHz bandwidth. For example, the bandwidth of each subchannel may be 80 MHz, 160 MHz, 240 MHz, 320 MHz, 400 MHz, 480 MHz, or greater. The bandwidths of the subchannels may be different. In the example shown in FIG. 5, the first subchannel 501 may have a bandwidth of 160 MHz, the second subchannel 502 also may have a bandwidth of 160 MHz, and the third subchannel 503 may have a bandwidth of 320 MHz. Thus, the total channel bandwidth 505 in this example is 640 MHz. The multi-generation PPDU 500 includes a legacy preamble portion 510 (such as the legacy preamble fields and RL-SIG). The legacy preamble portion 510 may be duplicated through each subchannel within the wireless channel or may be different as described with reference to FIG. 13. Following the legacy preamble portion 510, the multi-generation PPDU 500 includes generation-specific preambles 551. The generation-specific preambles 551 may be based on different generations and may be signaled in different subchannels. For example, the generation-specific preambles 551 include a first preamble 511 in the first subchannel 501, a second preamble 512 in the second subchannel 502, and a third preamble 513 in the third subchannel 503. Each of the generation-specific preambles 551 may include a U-SIG as well as generation-specific signaling as described with reference to FIGS. 3, 4A, and 4B. For example, the first preamble 511 may be similar to the first preamble 410 described with reference to FIG. 4A and may be formatted according to a first generation of a wireless communication specification defined by IEEE 802.11be. The second preamble 512 may be similar to the second preamble 420 described with reference to FIG. 4B and may be formatted according to a second generation of a wireless communication specification defined by the next generation of the IEEE 802.11. The third preamble 513 may be yet another generation of IEEE 802.11 or may be another instance of the IEEE 802.11be or next generation format.

Following the generation-specific preambles 551, the multi-generation PPDU 500 may include a data field 552. In the example of FIG. 5, the data field 552 is a single data field 521 that spans the full channel bandwidth 505. The generation-specific preambles 551 may include RU assignments to different STAs. The RU assignments may indicate resources within the single data field 521. In some implementations, the size and distribution of the RUs available may be based on the amendment to the IEEE 802.11 standard for each generation. For example, the first generation of the IEEE 802.11 standard may define RU allocation tables that can be used for up to 320 MHz bandwidth (which is only half of the total channel bandwidth 505 in the example of FIG. 5). Thus, the first preamble 511 may include RU allocations that are within the first subchannel 501 and the second subchannel 502. Hypothetically, the next generation of the IEEE 802.11 standard may support RU allocation for a larger bandwidth, such as the full channel bandwidth 505 of 640 MHz. The second preamble 512 may include RU allocations from within the first subchannel 501, the 502, and the third subchannel 503. In other words, the subchannel sizes may be relevant for the generation-specific preambles 551 but not for the data field 552, depending on the RU allocation tables and options present in each generation of the IEEE 802.11 standard. In another example, the RU allocations may be limited or restricted based on the subchannel sizes as described with reference to FIG. 6.

In some implementations, an AP may adjust the generation-specific preambles 551 to reduce a PAPR of the preamble portion of the multi-generation PPDU 500. As described previously, the generation-specific preambles 551 may be generated according to their respective generations based on the bandwidth of their respective subchannels, which may be referred to as subchannel bandwidth. For example, the first preamble 511 may be formatted based on the first generation resulting in a PAPR that is optimal for a subchannel bandwidth of the first subchannel 501. Similarly, the second preamble 512 and the third preamble 513 may have a PAPR characteristic that is optimal for the second subchannel 502 and the third subchannel 503, respectively. While the generation-specific preambles may have an optimal PAPR for the particular bandwidth of the subchannel, when the first preamble 511, the second preamble 512, and the third preamble 513 are frequency-multiplexed to form the multi-generation PPDU 500, the total PAPR of the generation-specific preambles 551 may be higher than optimal. To reduce the PAPR, the AP may apply a phase rotation to one or more of the generation-specific preambles 551. The phase rotation may be configured to reduce the overall PAPR of the generation-specific preambles 551 compared to that which would be associated with the multi-generation PPDU 500 without the phase rotation applied to the one or more of the generation-specific preambles 551.

As an example, the first preamble 511 may have no phase rotation. The AP may apply a phase rotation to the second preamble 512. In some implementations, the phase rotation may be based on an aggregate bandwidth of the multi-generation PPDU 500 in the channel bandwidth 505. Examples of phase rotations may include a 0, j, −1, or −j phase rotation (equivalent to a 0 degree, 90 degree, 180 degree, or 270 degree phase rotation). The phase rotation applied to a generation-specific preamble may be in addition to or in lieu of any sub-preamble phase rotations defined in a particular generation. A sub-preamble phase rotation refers to phase rotations that are performed on parts of a generation-specific preamble according to a particular generation of the wireless communication specification. For example, a generation may define a phase rotation scheme for portions of a preamble that will become the generation-specific preamble in the multi-generation PPDU. The phase rotation scheme in a particular generation may be referred to as sub-preamble phase rotations. In some implementations, those phase rotations may still be applied in addition to a phase rotation that is applied by an AP to the full generation-specific preamble when the generation-specific preamble is included in a multi-generation PPDU.

In some implementations, the AP may apply a different phase rotation to multiple ones of the generation-specific preambles 551. For example, the first preamble 511 may have no phase rotation, the second preamble 512 may have a 90 degree phase rotation, and the third preamble 513 may have a 180 degree phase rotation. In some implementations, each phase rotation may be determined based on an phase rotation applied to a generation-specific preamble in an adjacent subchannel.

Phase rotation is just one example of a modification that may be made to the generation-specific preambles 551 to prepare them for use in a multi-generation PPDU 500. This disclosure includes other examples of modifications that may be made to support multi-generation communication in a WLAN.

In some aspects, the generation-specific preambles 551 may include STFs and LTFs defined by a particular generation of the wireless communication specification that are different from those of another generation of the wireless communication specification. The STF and LTF sequences in each generation may be predetermined based on PAPR for a preamble having a particular bandwidth. In some implementations, an AP may adjust a transmission power, content, or format of the STF and LTF in a component PPDU to improve reception of the multi-generation PPDU 500. In another example, the AP may generate the STF and LTF for each generation-specific preamble based on an aggregate bandwidth (rather than subchannel bandwidth) of the multi-generation PPDU 500. In another example, the AP may apply a phase rotation to the STF, the LTF, the data field, or any combination thereof in one or more of the generation-specific preambles or data fields associated with particular subchannels. In some implementations, an AP may add padding to one or more generation-specific preambles 551 or data field(s) to support preamble orthogonality in the multi-generation PPDU 500.

The multi-generation PPDU 500 may include a single data field 521 after the generation-specific preambles 551, which may span the full bandwidth of the multi-generation PPDU 500. The generation-specific preambles 551 may include RU allocations (or "assignments") within the single data field 521. However, each generation may define different tone plans for different bandwidth sizes. In some implementations, the single data field may be segmented into portions (such as a subchannel bandwidth) that use a particular tone plan based on that subchannel bandwidth. Because the RU allocations are based on the tone plan, a generation-specific preamble may limit RU allocations to only a segment of the single data field 521 that uses a tone plan specified for that generation. When two or more generations use the same tone plan for a subchannel bandwidth, either or both of the generation-specific preambles for those generations may include RU allocations in a segment of the single data field 521 with that tone plan.

Figure 6:
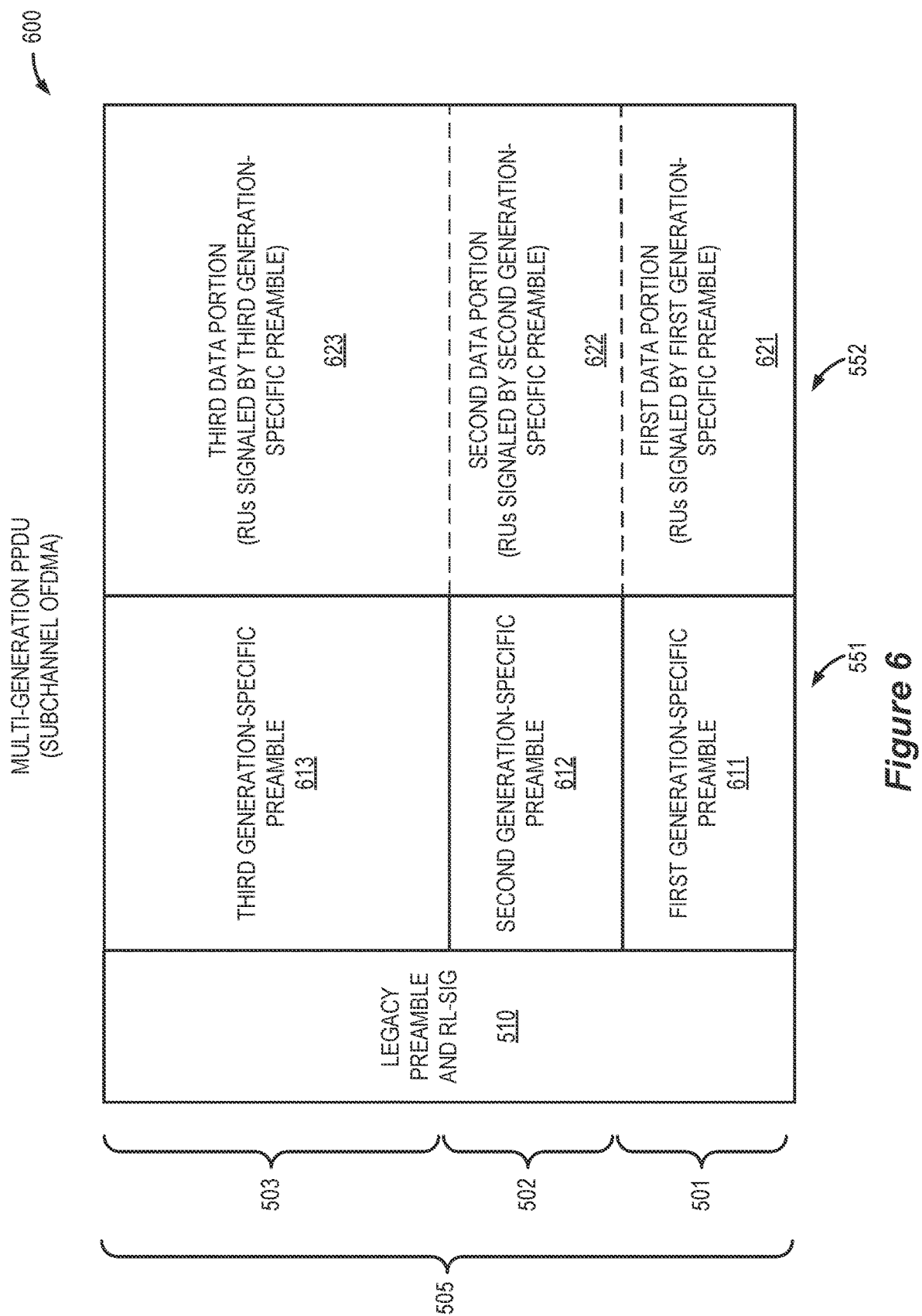
FIG. 6 shows an example multi-generation PPDU in which resource unit (RU) allocations signaled by a first generation-specific preamble are limited to the same subchannel as the first preamble according to some implementations.

FIG. 6 shows an example multi-generation PPDU 600 in which RU allocations signaled by a first generation-specific preamble are limited to the same subchannel as the first generation-specific preamble according to some implementations. The structure of the multi-generation PPDU 600 may be similar to the structure of the multi-generation PPDU 500 described with reference to FIG. 5. For example, the multi-generation PPDU 600 may include a legacy preamble portion 510, a plurality of generation-specific preambles 551, and a data field 552. A first generation-specific preamble 611 may occupy a first subchannel 501, a second generation-specific preamble 612 may occupy a second subchannel 502, and a third generation-specific preamble 613 may occupy a third subchannel 503. The multi-generation PPDU 600 in FIG. 6 differs from the multi-generation PPDU 500 in FIG. 5, in that the multi-generation PPDU 600 restricts RU allocations in the data field 552 to the subchannel sizes. Each generation-specific preamble (such as the first generation-specific preamble 611, the second generation-specific preamble 612, and the third generation-specific preamble 613) may include RU allocations (or "assignments") within the data field 552. In some implementations, a generation-specific preamble may restrict RU allocations within a subchannel portion of data field 552. Thus, the data field 552 that follows the generation-specific preambles may be segmented based on the subchannels and the generation-specific preambles may include only the RU assignments within its same subchannel. For example, the first generation-specific preamble 611 may include RU allocations in the first data portion 621 of the data field 552 based on the first subchannel 501. The RU allocations signaled in the first generation-specific preamble 611 may refer to allocations within a first subchannel bandwidth for the first data portion 621 of the data field 552. Similarly, the RU allocations indicated in the second generation-specific preamble 612 may be limited to a second data portion 622 of the data field 552, and the RU allocations indicated in the third generation-specific preamble 613 may be limited to a third data portion 623 of the data field 552. Although the subchannel RU restrictions are shown for all the generation-specific preambles 551, some implementations may use subchannel RU restrictions for only some of the generation-specific preambles 551. For example, in some implementations, the first generation-specific preamble 611 may be restricted to RU allocations within the first data portion 621 while the second generation-specific preamble 612 is not restricted to the second data portion 622. Similar to FIG. 5, the multi-generation PPDU 600 in FIG. 6 may have a phase rotation applied to one or more of the generation-specific preambles 551.

FIG. 6 also may provide an example in which different tone plans may be used portions of the data field 552. For example, the first data portion 621 may be transmitted using a first tone plan defined in the first generation for a bandwidth size of the first subchannel 501. The second data portion 622 may be transmitted using a second tone plan defined in the second generation for a bandwidth size of the second subchannel 502. The third data portion 623 may be transmitted using a third tone plan defined in the third generation for a bandwidth size of the third subchannel 503. The tone plans may be different even if the bandwidth size is the same. For example, IEEE 802.11be (EHT) may define an 80-MHz OFDMA tone plan that is different than the 80-MHz OFDMA tone plan in IEEE 802.11ax (HE). The RU assignments in the generation-specific preambles 551 may be restricted to only RUs that are based on the tone plan in their respective portion of the data field 552.

It is possible that two tone plans from different generations may be the same. For example, IEEE 802.11be (EHT) may define an 80-MHz OFDMA tone plan that may be adopted as the 80-MHz OFDMA tone plan in the next generation after IEEE 802.11be. The RU assignments in the IEEE 802.11be preamble and the next generation preamble may be allocated from any data portion of the data field 552 that uses the 80 MHz OFDMA tone plan.

Figure 7A:
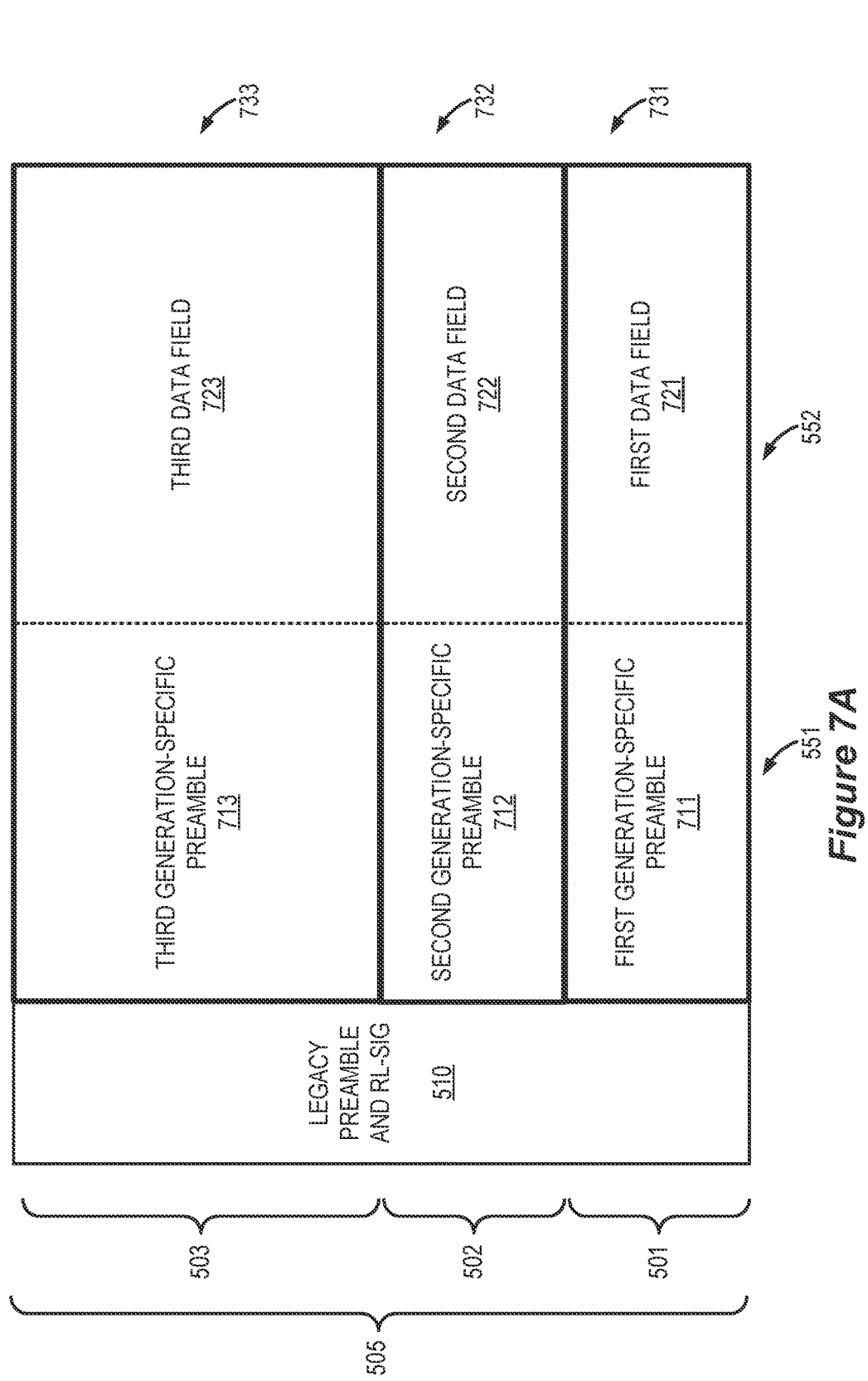
FIG. 7A shows an example multi-generation PPDU formatted as a compound PPDU that includes concurrently signaled sub-PPDUs in different subchannels according to some implementations.

FIG. 7A shows an example multi-generation PPDU 700 formatted as a compound PPDU that includes concurrently signaled PPDUs in different subchannels according to some implementations. Similar to the corresponding features described with reference to FIGS. 5 and 6, the multi-generation PPDU 700 may include a legacy preamble portion 510 followed by generation-specific preambles 551 in different subchannels. The multi-generation PPDU 700 differs from the previous examples in that each of the generation-specific preambles 551 are associated with corresponding generation-specific data fields in the data field 552. For example, a first generation-specific preamble 711 and a first data field 721 may occupy a first subchannel 501. Together, the first generation-specific preamble 711 and the first data field 721 may be formatted as a first PPDU 731 based on a first generation of a wireless communication specification. For example, the first PPDU 731 may be similar to the PPDU 401 described with reference to FIG. 4A. Similarly, a second generation-specific preamble 712 and a second data field 722 may occupy a second subchannel 502 and may form a second PPDU 732 based on a second generation of a wireless communication specification. For example, the second PPDU 732 may be similar to the PPDU 402 described with reference to FIG. 4B. A third generation-specific preamble 713 and a third data field 723 may occupy a third subchannel 503 and may be formatted according to a third generation of a wireless communication specification as defined by a future generation of the IEEE 802.11 standard. Rather than transmit each of the separate PPDUs 731, 732, and 733, an AP may combine them to form a multi-generation PPDU having the structure described with reference to FIG. 7A. The multi-generation PPDU also may be referred to as a compound PPDU, combination PPDU, a Multi-Gen PPDU, a multi-PPDU, an mPPDU, an Aggregate PPDU (A-PPDU), or other terms. Similar to FIGS. 5 and 6, the multi-generation PPDU 700 in FIG. 7A may have a phase rotation applied to one or more of the generation-specific preambles 551.

When preparing the multi-generation PPDU 700 based on a combination of sub-PPDUs 731, 732, and 733, a WLAN device may modify the sub-PPDUs so that the generation-specific preambles and data fields line up in time. For example, for preamble orthogonality, it may be desirable for the OFDM symbols of the generation-specific preambles 551 to line up in time. For example, the OFDM symbols may use a common OFDM symbol configuration (such as the same symbol duration or cyclic prefix, among other examples), a common guard interval duration, subcarrier spacing, or other common features such that the generation-specific preambles 551 can be communicated concurrently in OFDM symbols. Furthermore, the quantity of OFDM symbols used for each generation-specific preamble may be consistent. In some implementations, extra OFDM symbols may be added to one or more of the generation-specific preambles 551 such that the generation-specific preambles 551 align in time. For example, if one of the generation-specific preambles 551 is shorter than the others, an AP may add padding so that the lengths of all the generation-specific preambles 551 are the same. Similarly, the AP may add padding to one or more of the generation-specific data fields so that the data fields have a same length and can be communicating using the same OFDM symbols for the wireless channel. For example, the AP may add padding to the data fields of all (or all but the longest) of the component sub-PPDUs so that they match a length or duration of the longest component PPDU that will be included in a multi-generation PPDU. By doing so, the AP can make the component PPDUs in the multi-generation end concurrently, albeit on different subchannels. When a receiving WLAN device processes the multi-generation PPDU, the receiving WLAN device may decode just the generation-specific preamble and data field in one corresponding subchannel as a standalone PPDU even though they were included as part of a multi-generation PPDU formed by multiple sub-PPDUs. If the receiving WLAN device is configured to respond with an acknowledgement, the padding will ensure that the acknowledgement will occur after the end of the multi-generation PPDU without interfering with other component PPDUs on other subchannels.

Figure 7B:
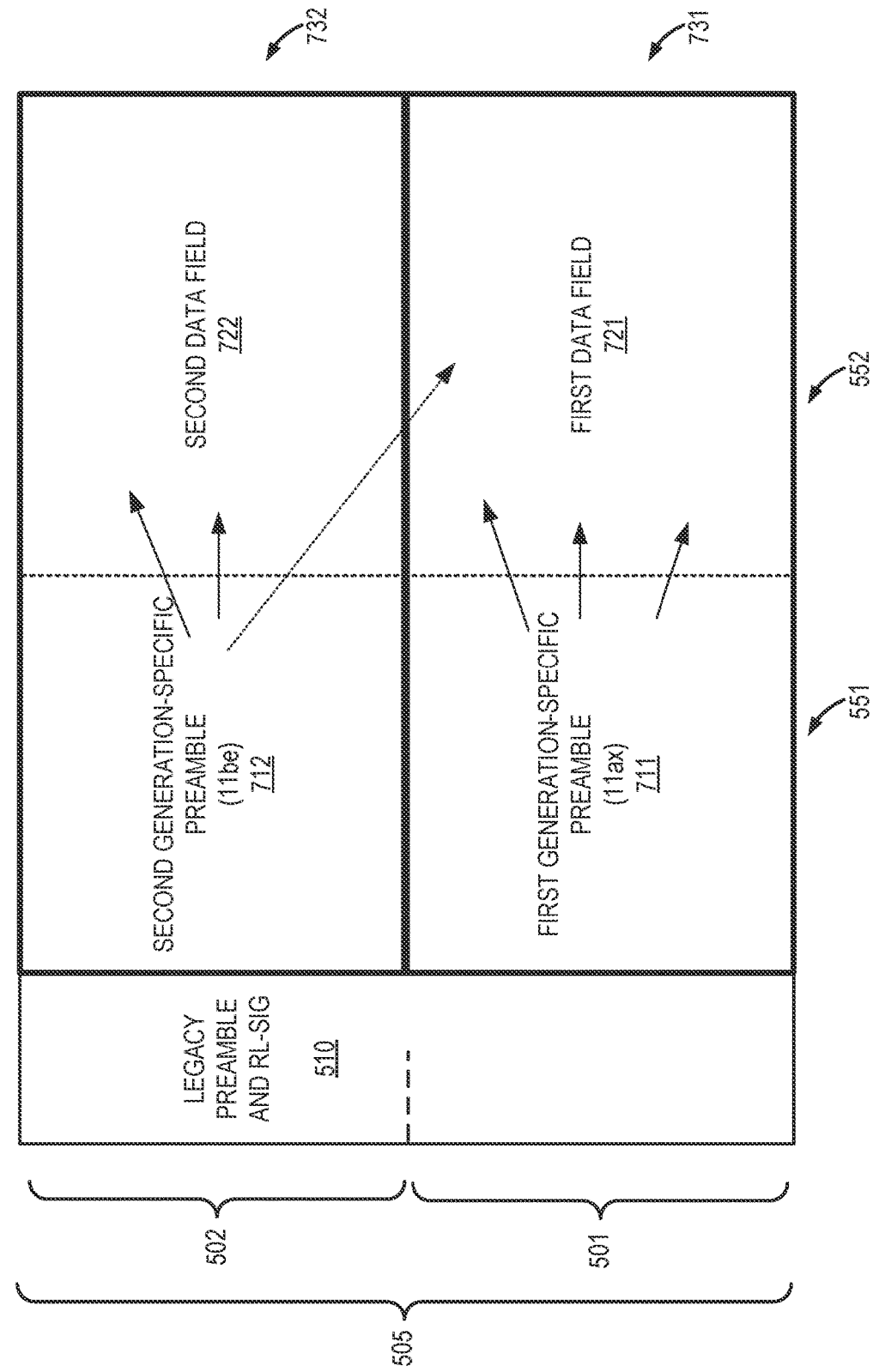
FIG. 7B shows another example multi-generation PPDU formatted to concurrently support multiple generations according to some implementations.

FIG. 7B shows another example multi-generation PPDU 701 formatted to concurrently support multiple generations according to some implementations. Similar to the corresponding features described with reference to FIG. 7A, the multi-generation PPDU 701 may include a legacy preamble portion 510 followed by generation-specific preambles 551 in different subchannels. In FIG. 7B, a first generation-specific preamble 711 may occupy a first subchannel 501 and may be formatted as an IEEE 802.11ax generation-specific preamble. A second generation-specific preamble 712 may occupy a second subchannel 502 and may be formatted as a generation-specific preamble. As an illustrative example, the wireless channel may have a 320 MHz channel bandwidth 505 and each of the first subchannel 501 and the second subchannel 502 have 160 MHz bandwidth.

The first generation-specific preamble 711 may restrict RU allocations to RUs located within a first data field 721 in the first subchannel 501 because IEEE 802.11ax supports 160 MHz bandwidth. For example, RU allocation tables and tone maps for IEEE 802.11ax may be limited to 160 MHz bandwidth. Meanwhile, IEEE 802.11be may support up to 320 MHz bandwidth and may define RU allocation tables and signaling to support the higher bandwidth. The second generation-specific preamble 712 may include signaling for an RU allocation that includes RUs located within the first data field 721 and the second data field 722. A wireless station that implements IEEE 802.11be may decode the second generation-specific preamble 712 to identify RUs allocated within the first and second subchannels 501 and 502. A wireless station that does not implement IEEE 802.11be but implements IEEE 802.11ax may decode the first generation-specific preamble 711 to identify RUs allocated within the first subchannel 501. Thus, the multi-generation PPDU 701 can concurrently transmit data to wireless stations using either IEEE 802.11ax and IEEE 802.11be.

The example multi-generation PPDUs 500, 600, 700 and 701 with reference to FIGS. 5, 6, 7A and 7B, respectively, are provided as illustrative examples of combining generation-specific preambles to form a multi-generation PPDU for a wireless channel. The combination of generation-specific preambles enables a wireless channel to support WLAN devices made for different generations of the IEEE 802.11 standard. In some implementations, a receiving WLAN device may observe a generation-specific preamble within a subchannel. For example, a STA that is parked or monitoring the first subchannel 501 the first generation-specific preamble (such as the first generation-specific preamble 511, the first generation-specific preamble 611, or the first generation-specific preamble 711 as described with reference to FIGS. 5, 6, 7A and 7B, respectively) while disregarding the generation-specific preambles in the other subchannels.

Figure 8:
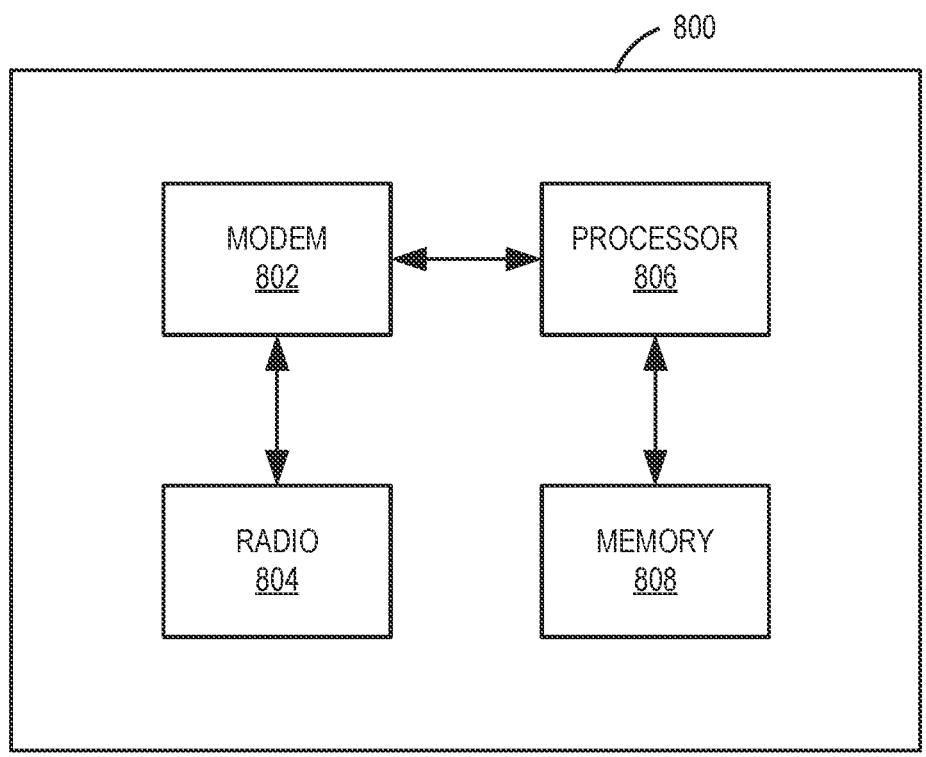
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described above with reference to FIG. 1. In some implementations, the wireless communication device 800 can be an example of a device for use in an AP such as the AP 102 described above with reference to FIG. 1. The wireless communication device 800 is capable of transmitting (or outputting for transmission) and receiving wireless communications (for example, in the form of multi-generation PPDUs). For example, the wireless communication device can be configured to transmit and receive packets in the form of physical layer convergence protocol (PLCP) protocol data units (PPDUs) conforming to an IEEE 802.11 family of standards, such as that defined by the IEEE 802.11-2016 standard or amendments thereof including, but not limited to, 802.11ah, 802.11ad, 802.11 ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 806 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs or frames. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 804 can include tangible storage media such as random-access memory (RAM) or read-only memory (ROM), or combinations thereof. The memory 804 also can store non-transitory processor- or computer-executable software (SW) code containing instructions that, when executed by the processor 806, cause the processor to perform various operations described herein for wireless communication, including the generation, transmission, reception and interpretation of PPDUs, MPDUs, frames or packets. For example, various functions of components disclosed herein, or various blocks or steps of a method, operation, process or algorithm disclosed herein, can be implemented as one or more modules of one or more computer programs.

Figure 9B:
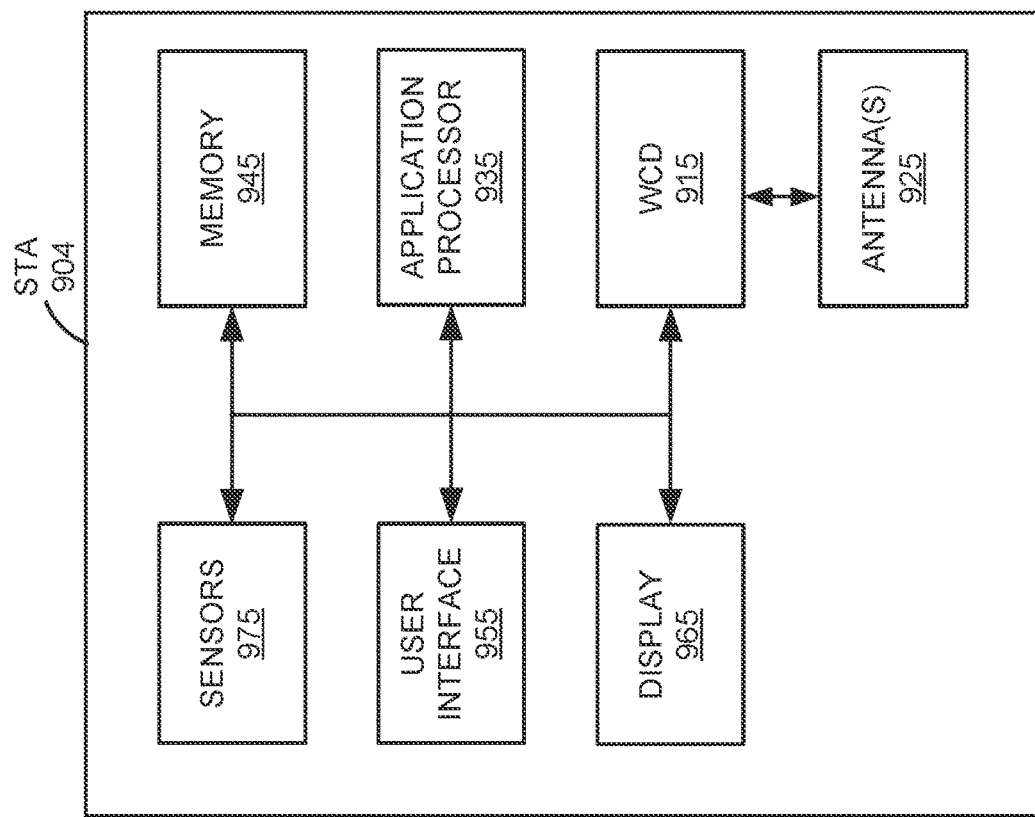
FIG. 9B shows a block diagram of an example STA.
Figure 9A:
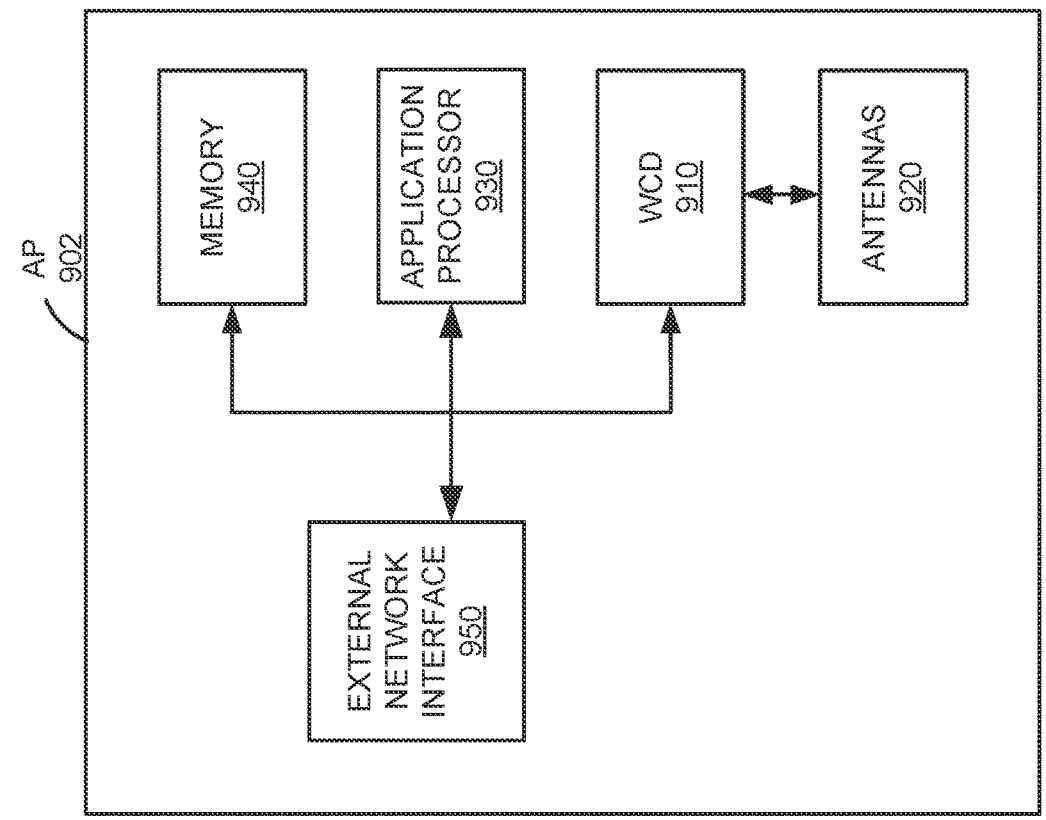
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, it is desirable to support multiple generations of a wireless communication specification (such as that defined by the IEEE 802.11 family of standards) in a single communication via a wireless channel. Various implementations relate generally to formats, structures, and techniques for combining data communications formatted according to different generations in the same multi-generation PPDU. Some implementations more specifically relate to the format of a multi-generation PPDU that includes both signaling and data for multiple generations associated with amendments to the IEEE 802.11 standard. The multi-generation PPDU may be referred to as a multi-generation PPDU because it supports multiple generations of the wireless communication specification defined by the IEEE 802.11 family of standards. In some implementations, the multi-generation PPDU may be formatted as a single PPDU in which a single data field spans the entire channel bandwidth following the generation-specific preambles for the different generations. In some other implementations, the multi-generation PPDU may be formatted as a compound PPDU that is formed from PPDUs of different generations, each including a generation-specific preamble and a data field based on the generation in a same respective subchannel of the wireless channel, that are then transmitted concurrently. In yet other implementations, the multi-generation PPDU may be formatted with generation-specific preamble signaling fields organized sequentially similar to time division multiplexing.

Particular implementations of the subject matter described in this disclosure can be implemented to realize one or more of the following potential advantages. As described initially above, the multi-generation PPDUs presented herein can support simultaneous communication to or from stations (STAs) that implement different generations of the wireless communication specification. As the wireless communication specification evolves to expand the channel bandwidth or to add other features, the multi-generation PPDUs may continue to enable communications formatted according to previous generations while supporting communications formatted using the new generations concurrently. Additionally, because the multi-generation PPDU may include multiple generation-specific preambles, RUs can be allocated with greater flexibility. The formats and modifications provided in this disclosure may reduce an overall PAPR of the preamble portion of a multi-generation PPDU. Furthermore, the techniques in this disclosure may support more options for combining formats from disparate generations. For example, the use of phase rotation, CSD, tone plan changes, spoofed bandwidth values, and restricted RU assignments, among other examples, may enable an AP to combine communications formatted according to different legacy generations in a multi-generation PPDU.

Figure 10:
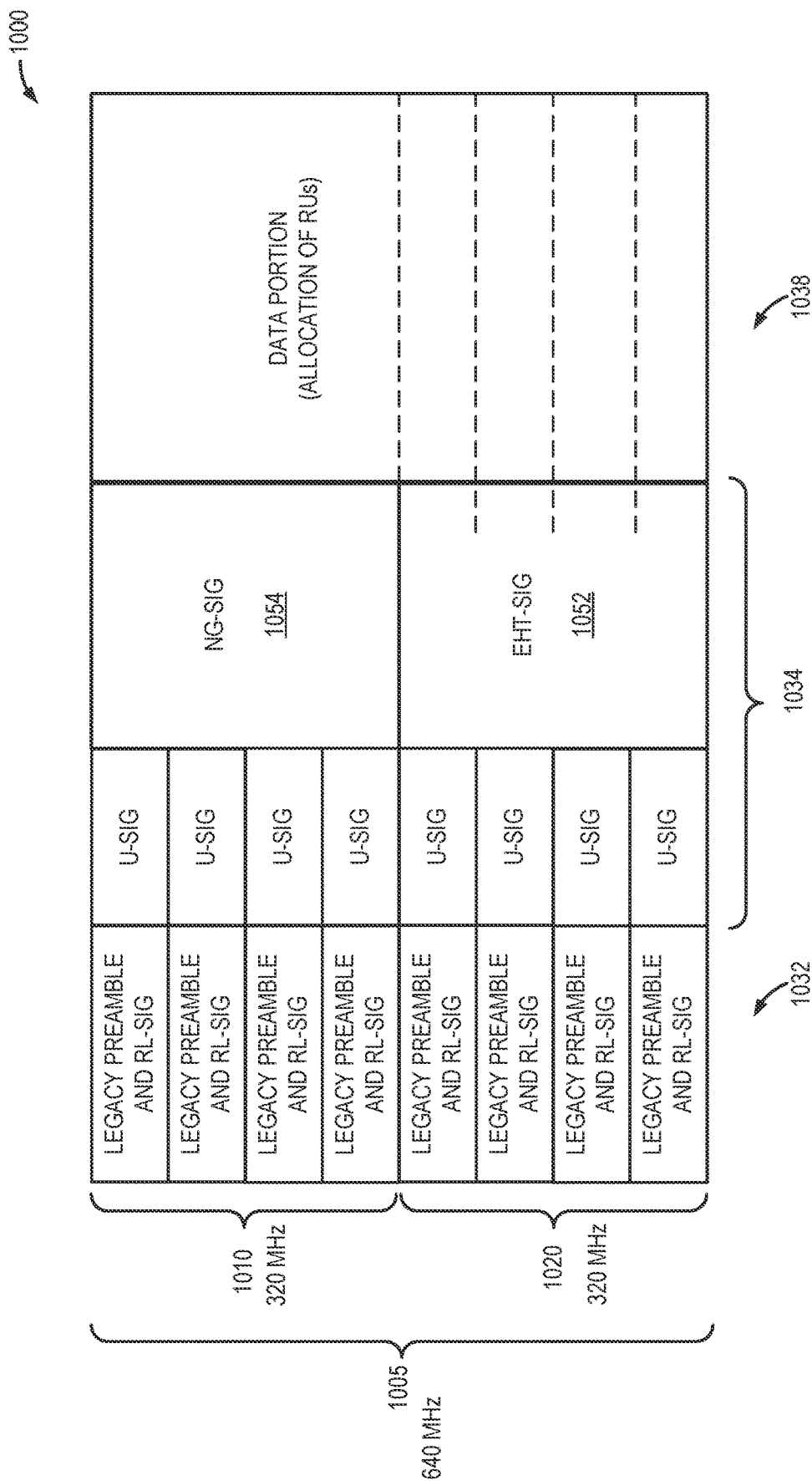
FIG. 10 shows an example multi-generation PPDU that supports greater than 320 MHz channel bandwidth according to some implementations.

FIG. 10 shows an example multi-generation PPDU 1000 that supports greater than 320 MHz channel bandwidth according to some implementations. In the example of FIG. 10, the channel bandwidth 1005 is 640 MHz. A lower portion 1020 may be a 320 MHz subchannel and an upper portion 1010 may be a 320 MHz subchannel. Within each subchannel, there may be different generation-specific signaling and formatting. The signaling and data fields may line up such that the generation-specific preambles 1034 and end of the data portions 1038 are aligned in time within the different subchannels. Furthermore, within each 320 MHz subchannel, there may be further division to create smaller subchannels. For example, the lower portion 1020 may include four 80 MHz bandwidth subchannels. The lower portion 1020 may include legacy preamble portion 1032, followed by a first generation-specific preamble that includes a U-SIG and EHT-SIG 1052. The U-SIG may be different for the different 80 MHz bandwidth subchannels. The EHT-SIG 1052 may allocate RUs within the lower portion 1020 of the data portion 1038 in the multi-generation PPDU 1000. In some implementations, the EHT-SIG 1052 may allocate the RUs based on the 80 MHz subchannels.

The upper portion 1010 may include the legacy preamble portion 1032 and U-SIG. Similar to the lower portion 1020, in the example of FIG. 10, the legacy preamble portion 1032 and U-SIG are parallelized in 80 MHz subchannels. A next generation signal field (NG-SIG) 1054 follows the U-SIGs. The NG-SIG 1054 may allocate RUs from within the upper portion 1010 as well as the lower portion 1020. In an example in which the multi-generation PPDU 1000 is transmitted by an AP, the AP may determine which RUs within the lower portion 1020 of the legacy preamble portion 1032 should remain unallocated in the EHT-SIG 1052 so that they can be allocated in the NG-SIG 1054.

The example of FIG. 10 is provided to illustrate an advantage of the multi-generation PPDU described as multi-generation PPDU 1000 when compared with traditional single-generation PPDUs. In a same transmission, an AP may communicate with STAs that implement the first generation-specific preamble design and also with STAs that implement the second generation-specific preamble design. Hypothetically, the second generation-specific preamble may support RU allocation within a larger channel bandwidth compared to the first generation-specific preamble. Therefore, the AP has more flexibility to schedule STAs within the wireless channel concurrently depending on which generation each STA supports and the resources available for each STA.

Figure 11:
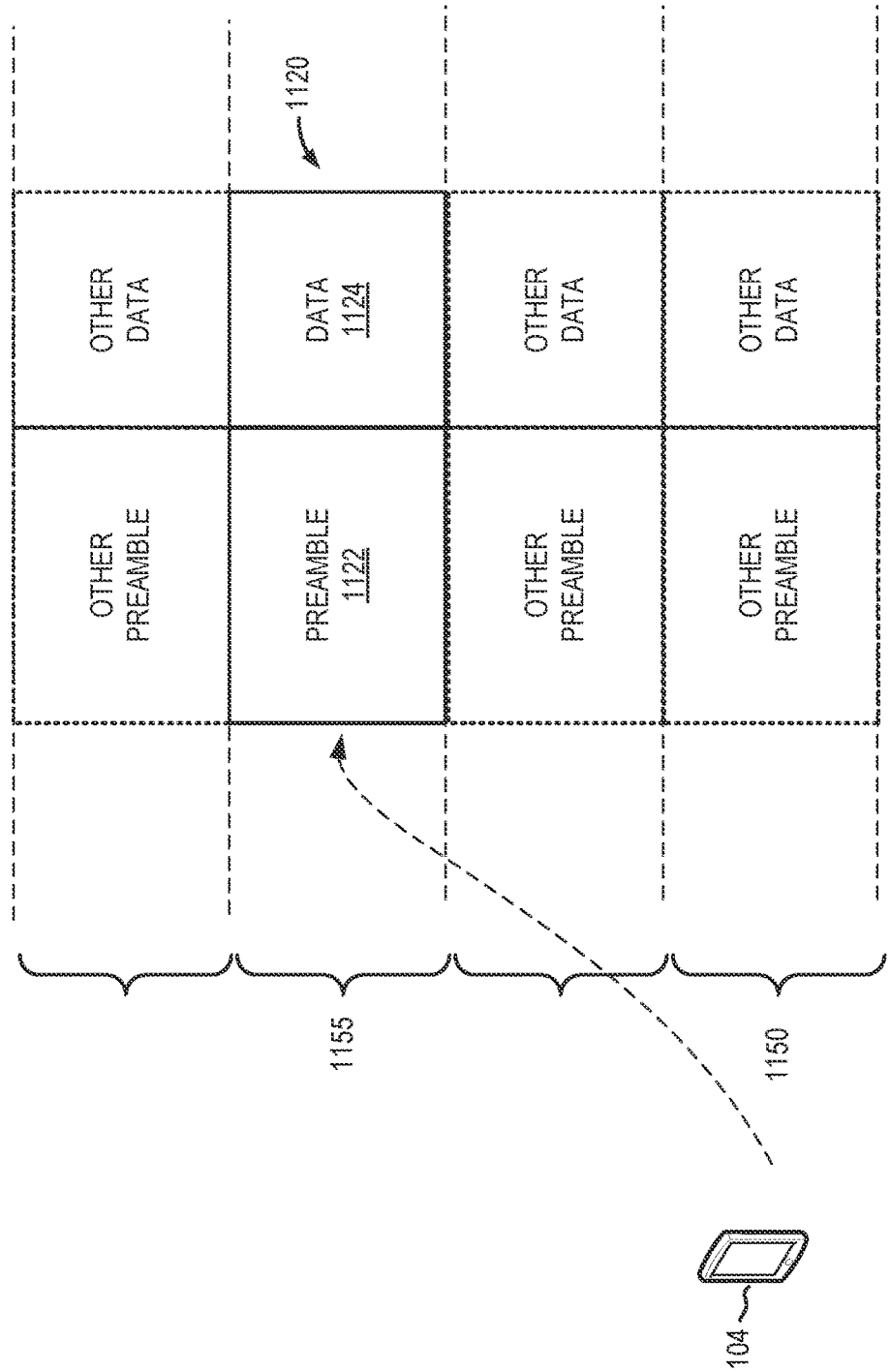
FIG. 11 shows an example of selective-bandwidth preamble decoding according to some implementations.

FIG. 11 shows an example of selective-bandwidth preamble decoding according to some implementations. Selective-bandwidth preamble decoding may enable a WLAN device to save power and improve reception of generation-specific preamble signaling. A WLAN device may tune or monitor a particular subchannel and decode the generation-specific preamble within that subchannel. In some implementations, the WLAN device may be tuned to a subchannel using RF tuning which involves MAC layer signaling and tuning time. Alternatively, or additionally, the WLAN device may tune to a subchannel using digital tuning in which the receiver radio obtains the full radio frequency signal but the receiver discards RF signals outside of the subchannel before processing and decoding the remaining RF signals. In the example of FIG. 11, a STA 104 may be configured to monitor a first subchannel 1155. In the first subchannel 1155, the STA may receive and process the generation-specific preamble 1122 and data field 1124. In some implementations, the STA 104 may treat the generation-specific preamble 1122 and data field 1124 as a standalone PPDU 1120, even though they are part of a multi-generation PPDU. As shown in FIG. 11, the first subchannel 1155 may be different from a primary subchannel 1150 normally associated with the wireless channel. The STA 104 may determine which subchannel (such as the first subchannel 1155) to monitor based on control signaling (not shown) in a previous transmission (not shown). For example, an AP may instruct the STA 104 to move from observing the primary subchannel 1150 and instead monitor the first subchannel 1155.

In some implementations, a multi-generation PPDU may be modified to support a legacy station that functions according to a legacy generation having a lower maximum PPDU bandwidth size than the multi-generation PPDU. For example, the IEEE 802.11ax standard may only define tone plans and PPDU bandwidth sizes up to 160 MHz bandwidth. A multi-generation PPDU that has an aggregate bandwidth of 160 MHz may include a combination of an IEEE 802.11ax generation-specific preamble in a first 80 MHz subchannel (primary 80 MHz) and an IEEE 802.11be generation-specific preamble in a second 80 MHz subchannel (secondary 80 MHz).

Additionally, the techniques in this disclosure may enable a multi-generation PPDU having a greater bandwidth size (over 160 MHz bandwidth) to include communications for a wireless station that implements the IEEE 802.11ax standard even though the IEEE 802.11ax does not define bandwidths over 160 MHz bandwidth. For example, a generation-specific preamble in a first subchannel may be populated with a bandwidth field value based on the bandwidth size of the subchannel rather than the aggregate bandwidth size of the multi-generation PPDU. An AP may populate the first generation-specific preamble with signaling to indicate the first subchannel bandwidth in a bandwidth field (such as a PPDU bandwidth (BW) field) of the first generation-specific preamble that would otherwise indicate the aggregate bandwidth of the wireless channel. When PPDU BW field indicates a subchannel bandwidth rather than the aggregate bandwidth, the incorrect bandwidth value indicated in the PPDU BW field may be referred to as a spoofed bandwidth value. The IEEE 802.11ax station interpreting that generation-specific preamble may process the generation-specific preamble and data field in that subchannel based on the spoofed bandwidth value without being aware that IEEE 802.11be (or next generation) stations can interpret the multi-generation PPDU as a larger bandwidth size. The PPDU BW field in other generation-specific preambles may indicate the actual bandwidth of the multi-generation PPDU or may include a spoofed value up to a maximum bandwidth supported by the generation for that generation-specific preamble. When using a spoofed bandwidth value in a generation-specific preamble, any RU assignments in that generation-specific preamble may be limited to only a portion of the data field up to the size indicated by the spoofed bandwidth value.

Figure 12:
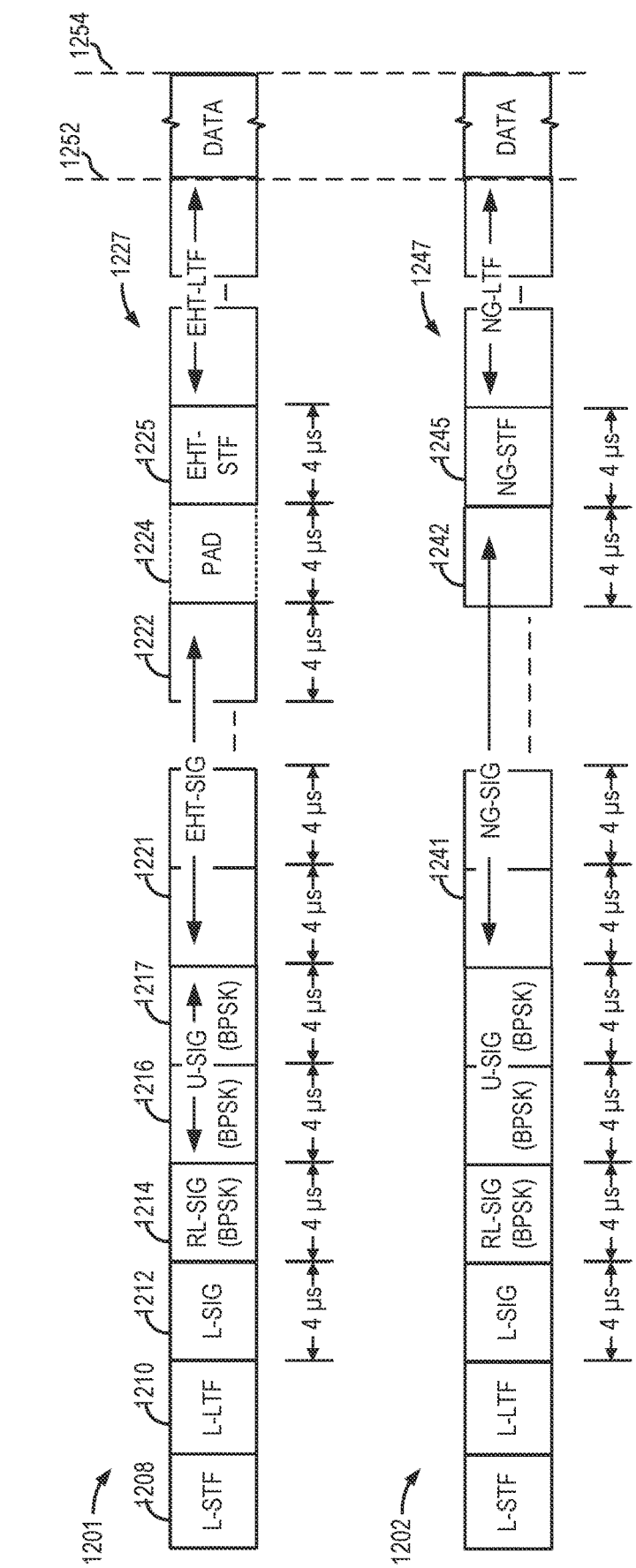
FIG. 12 shows an example of preamble orthogonality according to some implementations.

FIG. 12 shows an example of preamble orthogonality according to some implementations. For comparison purposes, a first sub-PPDU 1201 is shown in relation to a second sub-PPDU 1202. The first sub-PPDU 1201 and second sub-PPDU 1202 may be examples of the PPDUs with reference to FIG. 7A or 7B. The concepts of preamble orthogonality may apply to multi-generation PPDUs that are formed by a combination of sub-PPDUs as well as those described with reference to FIGS. 5 and 6. The preamble orthogonality enables the multi-generation PPDU to include generation-specific preambles that align in time and are orthogonal. For example, the generation-specific preambles may be the same duration and utilize consistently sized OFDM symbols. In some implementations, the preamble orthogonality may be achieved by using equal numbers of 1×, 2×, and 4× symbols (with the same guard interval) in the generation-specific preambles.

The first sub-PPDU 1201 is shown as a series of OFDM symbols having a fixed cyclic prefix length. The first sub-PPDU 1201 includes the L-STF 1208, the L-LTF 1210, the L-SIG 1212, and the RL-SIG 1214 followed by the U-SIG and EHT-SIG. The L-SIG 1212 and the RL-SIG 1214 may each be a single OFDM symbol. The U-SIG may occupy two OFDM symbols 1216 and 1217. The EHT-SIG may occupy multiple OFDM symbols 1221-1222. Following the EHT-SIG, the first generation-specific preamble may include an OFDM symbol 1225 for an EHT-STF and one or more symbols 1227 for an EHT-LTF. The EHT-LTF also may be referred to as a generation-specific LTF. Each of the OFDM symbols before the generation specific LTF may have an OFDM symbol duration of 4 µs (which includes a 3.2 µs FFT duration plus a 0.8 µs cyclic prefix).

The second sub-PPDU 1202 is also shown as a series of OFDM symbols having a same structure as the first sub-PPDU 1201. Instead of the EHT-SIG, the second sub-PPDU 1202 may have an NG-SIG that occupies multiple OFDM symbols 1241-1242. To maintain preamble orthogonality, when the first sub-PPDU 1201 and the second sub-PPDU 1202 are transmitted as part of a multi-generation PPDU, the generation-specific preambles should end at the same time 1252 and have the same symbol characteristics. Thus, in some implementations, a padding symbol 1224 may be added to one of the generation-specific signal fields so that the number of OFDM symbols is consistent for both of the generation-specific preambles. In some implementations a multi-user (MU) preamble design for each generation-specific preamble may be used because the MU preamble design is variable length and may support padding when needed to align the lengths of the generation-specific preambles. Continuing with the second sub-PPDU 1202, after the NG-SIG, the second generation-specific preamble may include an OFDM symbol 1245 for the NG-STF and one or more symbols for the NG-LTF 1247. The NG-LTF also may be referred to as a generation-specific LTF. Each of the OFDM symbols before the generation specific LTF may have an OFDM symbol duration of 4 µs (which includes a 3.2 µs FFT duration plus a 0.8 us cyclic prefix).

Another aspect of preamble orthogonality is to align the pre-LTF OFDM symbols (referring to the generation specific LTFs). For example, both the first generation-specific preamble and the second generation-specific preamble may use 1×OFDM symbols having the same symbol duration and cyclic prefix for the pre-LTF OFDM symbols. Using the same OFDM symbol configuration and quantity of OFDM symbols for both the generation-specific preambles may ensure that the length of the pre-LTF OFDM symbols is consistent throughout the multi-generation PPDU.

In addition to aligning the end 1252 of the generation-specific preambles, in some implementations, an AP may add padding the data portion so that the data fields (and thus the multi-generation PPDU) end at the same time 1254.

Figure 13:
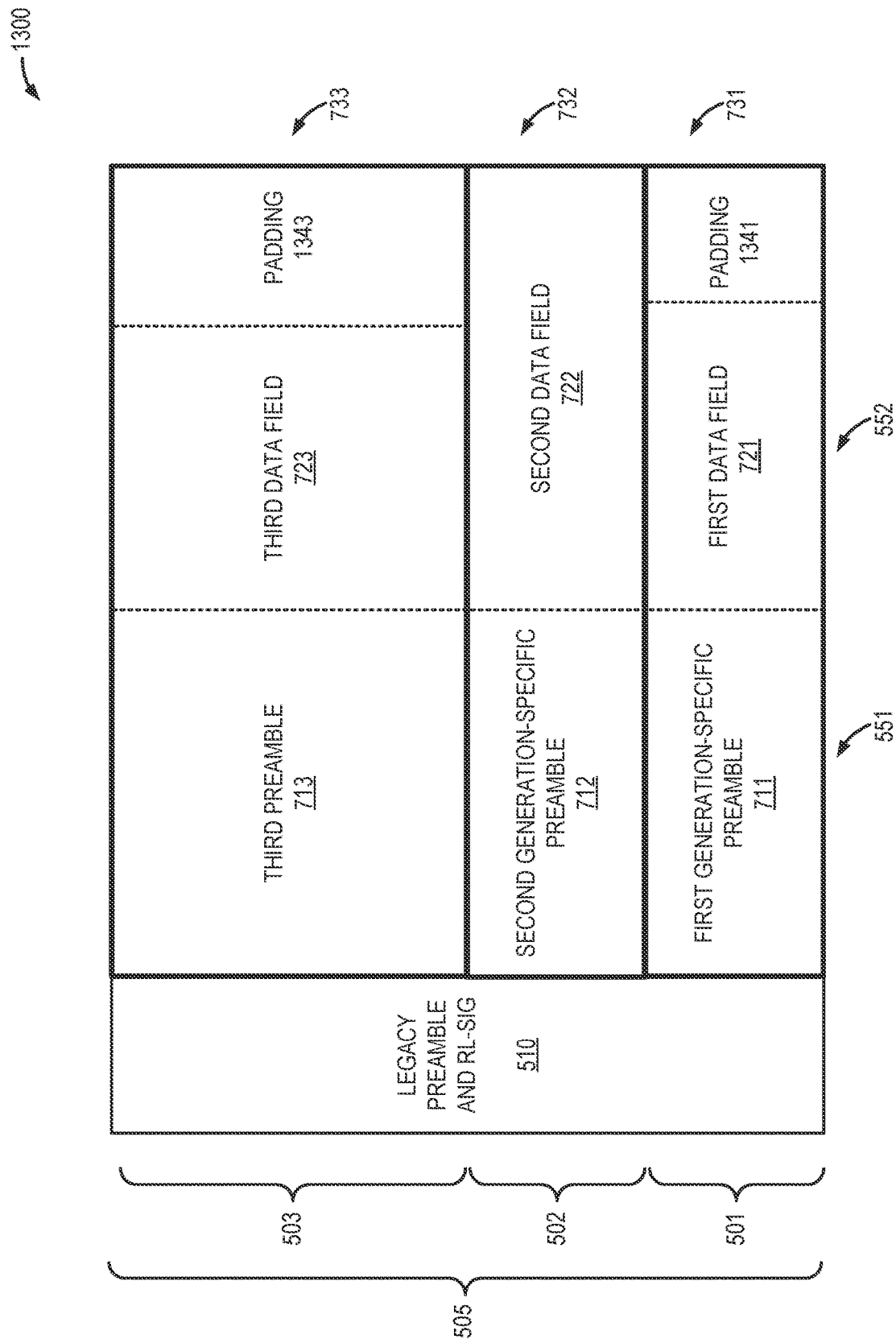
FIG. 13 shows an example multi-generation PPDU that includes padding in one or more of the concurrently signaled sub-PPDUs according to some implementations.

FIG. 13 shows an example multi-generation PPDU 1300 that includes padding in one or more of the concurrently signaled sub-PPDUs according to some implementations. The multi-generation PPDU 1300 is similar to the multi-generation PPDU 700 described with reference to FIG. 7. As described in FIG. 7, the first generation-specific preamble 711 and the first data field 721 may be formatted as a first PPDU 731 based on a first generation. The second generation-specific preamble 712 and the second data field 722 may be formatted as a second PPDU 732 based on a second generation. The third generation-specific preamble 713 and the third data field 723 may be formatted as a third PPDU 733 based on a third generation. The duration of each of the PPDUs 731, 732, and 733 may not naturally be the same. However, it is desirable the PPDUs 731, 732, and 733 ends on the full bandwidth of the multi-generation PPDU 1300 at the same time. To align the ends of the PPDUs 731, 732, and 733, padding may be added to one or more of the PPDUs 731, 732, and 733. For example, FIG. 13 shows padding 1341 added to the first PPDU 731 and padding 1343 added to the third PPDU 733. In some implementations, an AP may determine a length or duration of the longest component PPDU to determine the padding to add to the remaining PPDUs. In this example, the terms "length" and "duration" may be used synonymously because they both refer to the component PPDUs 731, 732, and 733 ending at a same time on the wireless channel.

FIG. 13 also may be used to describe another aspect related to the length of the multi-generation PPDU 1300. Each of the component PPDUs 731, 732, and 733 will have a same duration. The duration may be signaled in a legacy length field of the legacy preamble portion 510. For example, the legacy preamble portion may include a legacy signal (L-SIG) field with a legacy length field. In some aspects, an AP may populate different length values in a legacy length field of a legacy preamble portion for different subchannels of the multi-generation PPDU. As described herein, the multi-generation PPDU may have different generation-specific preambles and data fields in the different subchannels. The generation-specific preambles may be formatted according to a multi-user (MU) PPDU format of the different generations. Historically, the legacy preamble portion included a legacy length field that was manipulated to identify the MU PPDU format. For example, in the IEEE 802.11ax amendment to the IEEE 802.11 standard, the first length value of an MU PPDU is set such that the modulo three of the legacy length value is equal to 2. In contrast, in the IEEE 802.11be amendment to IEEE 802.11 standard, the legacy length value is set such that the modulo three of the legacy length value is equal to 0. Even though both formulas for the legacy length value represent a same duration of the PPDU, the values are different due to the modulo condition.

In some implementations, the AP may populate a first length value for the legacy length field in a first subchannel and may populate a second length value for the legacy length field in a second subchannel, based on the generations of the wireless communication specification being used for the respective subchannels. Referring to FIG. 13, the AP may populate a first length value for the legacy length field in the L-SIG of the legacy preamble portion 510 in the first subchannel 501 and may populate a second length value for the legacy length field in the L-SIG of the legacy preamble portion 510 in the second subchannel 502.

Figure 14:
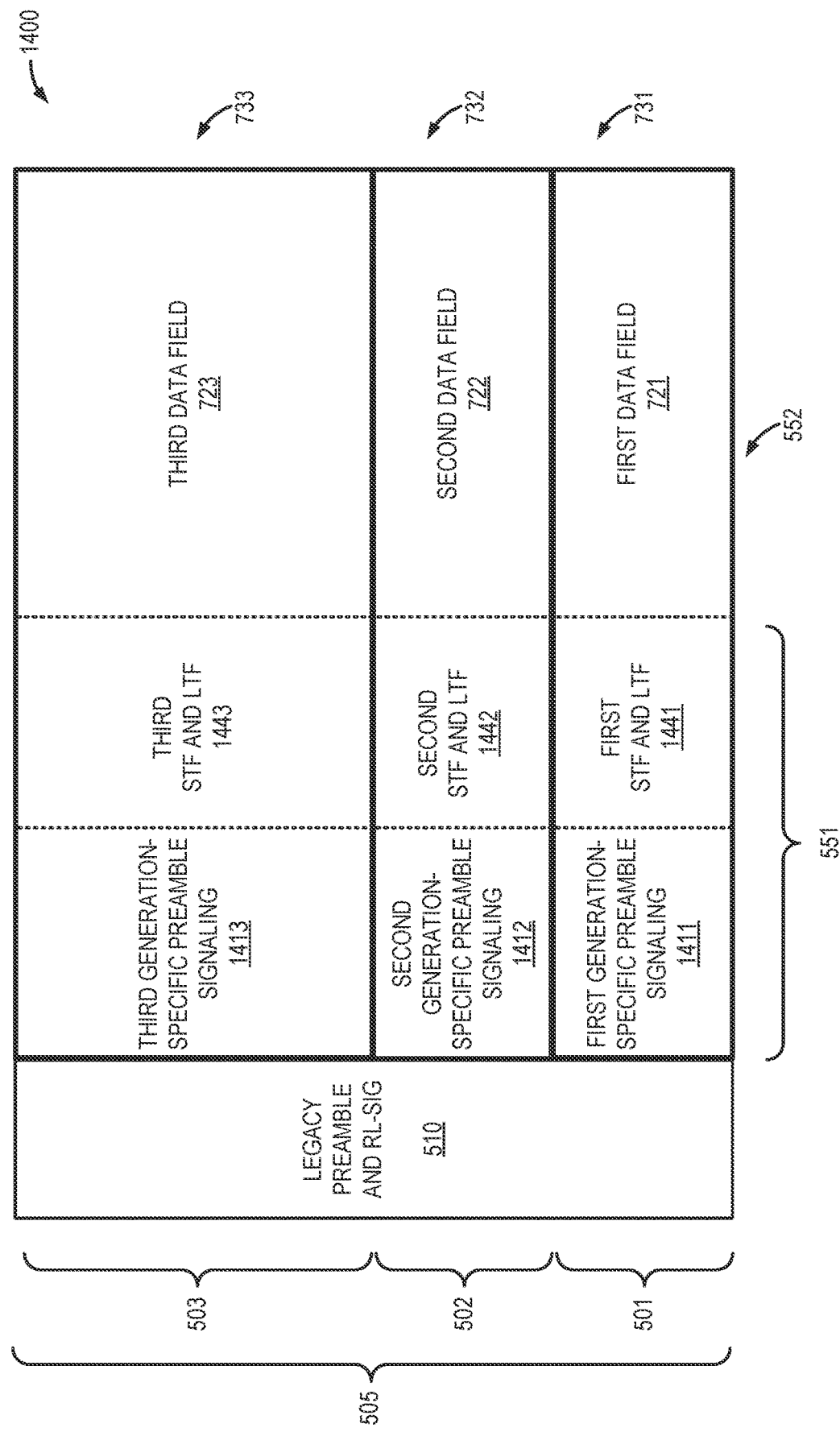
FIG. 14 shows an example multi-generation PPDU with different short training fields (STFs) and long training fields (LTFs) to illustrate some implementations to address peak-to-average-power ratio (PAPR).

FIG. 14 shows an example multi-generation PPDU 1400 with different STFs and LTFs to illustrate some implementations to address PAPR. The multi-generation PPDU 1300 is similar to the multi-generation PPDU 700 described with reference to FIG. 7. As described in FIG. 7, the multi-generation PPDU 1400 may include generation-specific preambles 551 populated in different subchannels 501, 502, and 503. In FIG. 14, the generation-specific preambles 551 are broken down to show that each generation-specific preamble may include preamble signaling, an STF, and an LTF. For example, a first preamble in the first subchannel 501 may include first preamble signaling 1411 and a first STF and LTF 1441. A second generation-specific preamble in the second subchannel 502 may second preamble signaling 1412 and a second STF and LTF 1442. A third generation-specific preamble in the third subchannel 503 may third preamble signaling 1413 and a third STF and LTF 1443.

Each of the STFs and LTFs in FIG. 14 may be formatted as defined in their respective generations to have a low PAPR for a bandwidth size of their respective subchannel bandwidths. However, when transmitting the first PPDU 731, the second PPDU 732, and the third PPDU 733 as frequency-multiplexed compound PPDU, the overall PAPR of the preamble portion of the multi-generation PPDU 1400 may be higher as a result of the adjacent subchannel transmissions. In some implementations, an AP may adjust transmission power, content, or format of the multi-generation PPDU to prevent the higher total PAPR. Alternatively, or additionally, the AP may adjust the STFs and LTFs to reduce the total PAPR.

In some implementations, the AP may generate one or more of the STFs and LTFs 1441, 1442, and 1443 based on the channel bandwidth 505 of the multi-generation PPDU 1400 rather than based on the subchannel bandwidths of the subchannels 501, 502, and 503. For those generations associated with the generation-specific preambles 551 that include definitions of STF and LTF sequences for the channel bandwidth 505, the STF and LTF may be based on the channel bandwidth 505. Thus, for a multi-generation PPDU 1400 that occupies a 320 MHz channel bandwidth 505, the multi-generation PPDU 1400 may include STFs and LTFs for IEEE 802.11be specification and for the later generations after the IEEE 802.11be that support 320 MHz bandwidth. The preamble signaling 1411, 1412, and 1413 may indicate the aggregate bandwidth of the multi-generation PPDU 1400 in the channel bandwidth 505 so that a receiving WLAN device knows which STF and LTF sequence to detect in their respective subchannel.

In some implementations, the AP may apply a per-segment phase rotation to one or more of the combinations of STF and LTF. For example, the AP may apply a phase rotation to the second 1442 in the second subchannel 502 such that the phase rotation of the second 1442 is different from any phase rotation (if at all) of the first STF and LTF 1441 in the first subchannel 501. When using a per-segment phase rotation, the STFs and LTFs may be generated based on the subchannel bandwidth of the subchannels 501, 502, and 503 rather than the channel bandwidth 505 of the multi-generation PPDU 1400. The per-segment phase rotations may be similar to those described with reference to FIG. 5. For example, the per-segment phase rotations of different ones of the STF and LTF 1441, 1442, and 1443 may be configured to reduce a total PAPR of the generation-specific preambles 551. Furthermore, the per-segment phase rotations may be determined based on a per-segment phase rotation (if at all) of the STF and LTF in an adjacent subchannel. In this example, a phase rotation that is applied to an STF and LTF of a particular subchannel is also applied to the data field in that subchannel. For example, if transmitting WLAN device applies a 90 degree phase rotation to the second 1442, the AP may also apply a 90 degree phase rotation to the second data field 722. A per-segment phase rotation may be just one example of how the STF, the LTF and the data field in a particular subchannel may be modified to be different than those in an adjacent subchannel. Alternatively, or additionally, a per-segment CSD may be applied to the STF, the LTF, and the data field in one or more of the subchannels. The per-segment phase rotation or per-segment CSD may be applied based on a per-segment adaptation to reduce the total PAPR of the multi-generation PPDU 1400.

In some implementations, a fixed per-tone change may be made to the STF and LTF sequences. For example, the AP may puncture or flip one or more tones in the second 1442 to reduce the total PAPR of the generation-specific preambles 551 when the generation-specific preambles 551 are frequency multiplexed. The fixed per-tone change may also be applied to the second data field 722 to be consistent with per-tone changes made to the second 1442.

Figure 15:
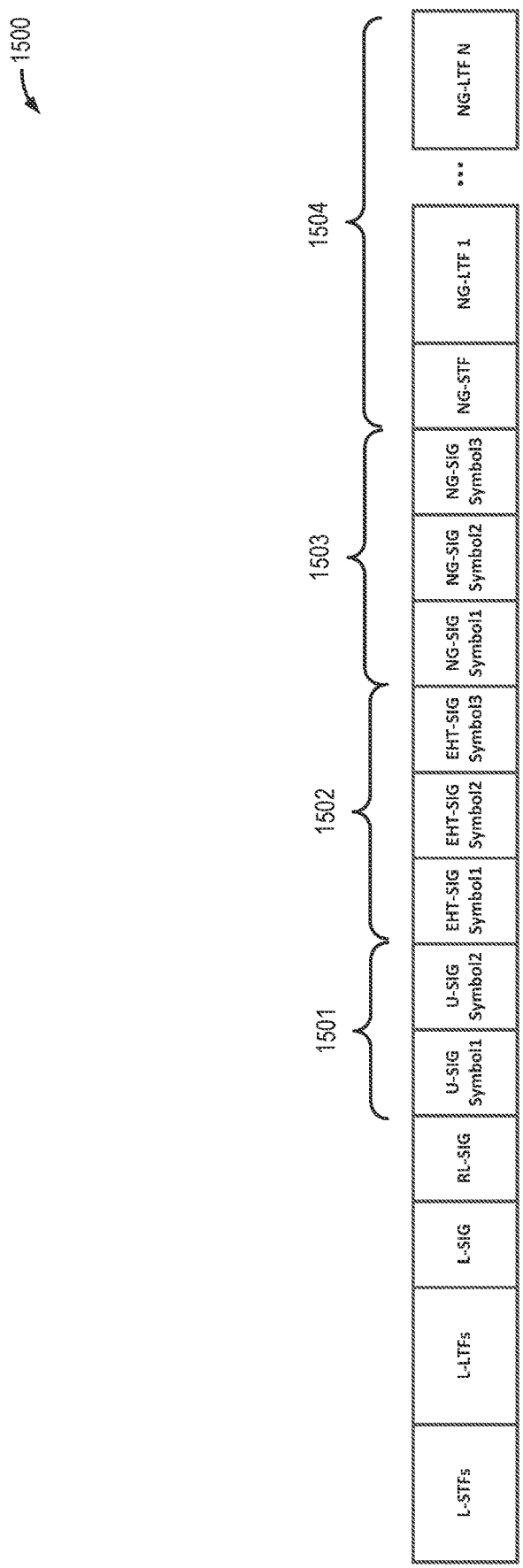
FIG. 15 shows example multi-generation PPDU having generation-specific preambles arranged in a time division multiplexing format according to some implementations.

FIG. 15 shows example multi-generation PPDU 1500 having generation-specific preambles arranged in a time division multiplexing format according to some implementations. Thus far, most of the examples in this disclosure are based on a frequency multiplexed multi-generation PPDU. FIG. 15 provides an example in which a time multiplexed multi-generation PPDU may support a plurality of different generations. The example in FIG. 15 is based on a combination of IEEE 802.11be and a next generation after IEEE 802.11be. IEEE 802.11be is introducing a universal signal (U-SIG) field. As described with reference to FIGS. 3, 4A, and 4B, the U-SIG field may be used for the EHT and NG signal fields. Many of the preamble fields may be common to the IEEE 802.11be and later generations. The example in FIG. 15 illustrates an example in which redundant preamble fields may be omitted.

The multi-generation PPDU 1500 includes the legacy preamble fields (such as the L-STF, the L-LTF, and the L-SIG) as well as the RL-SIG as described elsewhere herein. Following the RL-SIG, the multi-generation PPDU 1500 includes the U-SIG field 1501. In some implementations, the U-SIG field 1501 may indicate a quantity of the generation-specific preamble signal fields that are included in the preamble of the multi-generation PPDU 1500. For example, the U-SIG field 1501 may include signaling to notify a receiving wireless station that the multi-generation PPDU 1500 includes an EHT signaling field 1502 and an NG signaling field 1503. The U-SIG field 1501 is just one example of a location where the existence of the NG signaling field 1503 may be indicated. For example, an indicator in the EHT signaling field 1502 may indicate a quantity or duration of further generation-specific signal fields (such as the NG signaling field 1503) that are in the multi-generation PPDU 1500 before the non-legacy (NL)-STF, the NL-LTF, and the data field (not shown). In the example of FIG. 1500, the NL-STF and the NL-LTF may be formatted according to the next generation after IEEE 802.11be and are labeled as NG-STF and the NG-LTF.

Although only one combination of NL-STF and NL-LTF are illustrated in FIG. 15, in some implementations there may be multiple consecutive combinations of NL-STF and NL-LTF. The consecutive combinations of NL-STF and NL-LTF may precede a respective data field associated with a different generation. Thus, the NL-STF, the NL-LTF, and the data field for each generation may be included in a different time period of the multi-generation PPDU 1500.

In some implementations, the NL-STF and the NL-LTF may be defined by the same sequence in two or more generations. For example, the EHT-STF/EHT-LTF and the NG-STF/NG-LTF may have a same sequence defined in IEEE 802.11be and the next generation after IEEE 802.11be, respectively. When the same NL-STF and NL-LTF can be used for two or more generations, the multi-generation PPDU 1500 may include only one copy of the NL-STF and the NL-LTF to remove the redundant copies.

Figure 16:
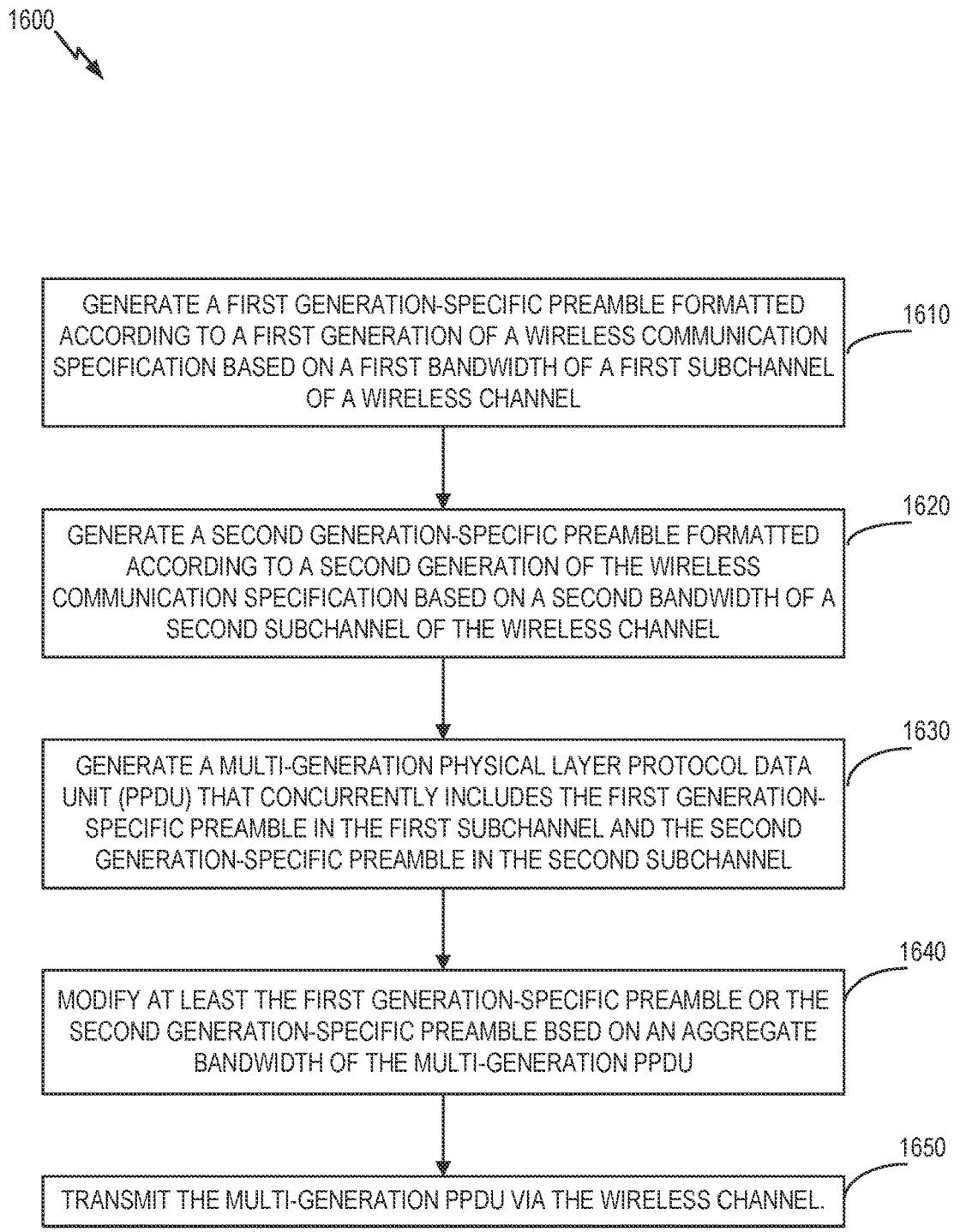
FIG. 16 shows a flowchart illustrating an example process for transmitting a multi-generation PPDU formatted according to some implementations.

FIG. 16 shows a flowchart illustrating an example process 1600 for transmitting a multi-generation PPDU formatted according to some implementations. The process 1600 may be performed by a wireless communication device such as the wireless communication device 800 described above with reference to FIG. 8. In some implementations, the process 1600 may be performed by a wireless communication device operating as or within an AP, such as one of the APs 102 and 902 described above with reference to FIGS. 1 and 9A, respectively. In some implementations, the process 1600 may be performed by a wireless communication device operating as or within a STA, such as one of the STAs 104 and 904 described above with reference to FIGS. 1 and 9B, respectively.

In some implementations, the process 1600 begins in block 1610 with generating a first generation-specific preamble formatted according to a first generation of a wireless communication specification based on a first bandwidth of a first subchannel of the wireless channel.

In block 1620, the process 1600 proceeds with generating a second generation-specific preamble formatted according to a second generation of the wireless communication based on a second bandwidth of a second subchannel of the wireless channel.

In block 1630, the process 1600 proceeds with modifying at least the first generation-specific preamble or the second generation-specific preamble for use in a multi-generation physical layer protocol data unit (PPDU) that includes both the first generation-specific preamble and the second generation-specific preamble.

In block 1630, the process 1600 proceeds with generating a multi-generation physical layer protocol data unit (PPDU) that concurrently includes the first generation-specific preamble in the first subchannel and the second generation-specific preamble in the second subchannel.

In block 1640, the process 1600 proceeds with modifying at least the first generation-specific preamble or the second generation-specific preamble based on an aggregate bandwidth of the multi-generation PPDU.

In block 1650, the process 1600 proceeds with transmitting the multi-generation PPDU via the wireless channel.

Figure 17:
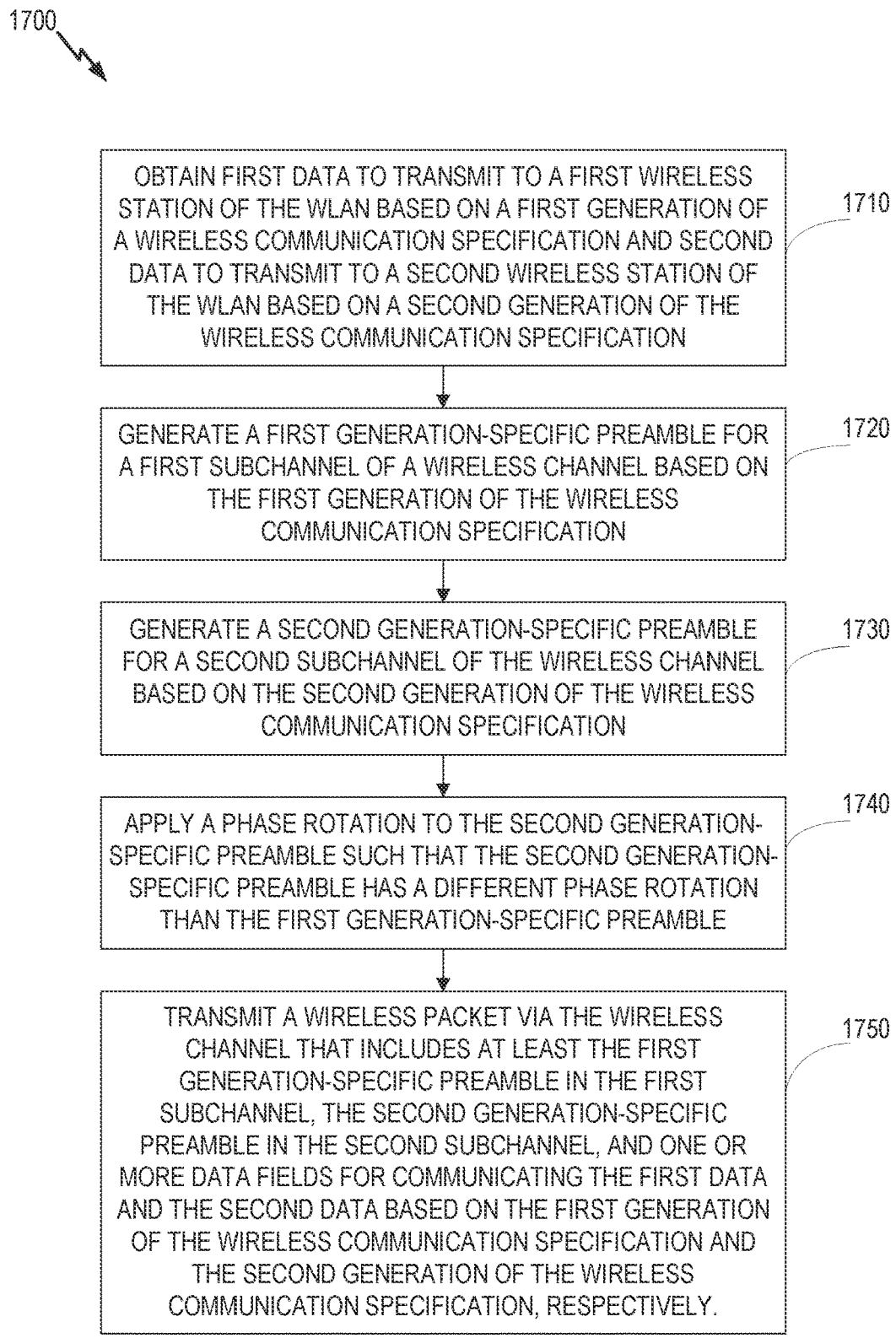
FIG. 17 shows a flowchart illustrating an example process for transmitting a multi-generation PPDU with a phase rotation according to some implementations.

FIG. 17 shows a flowchart illustrating an example process 1700 for transmitting a multi-generation PPDU with a phase rotation according to some implementations. The process 1700 may be performed by a wireless communication device such as the wireless communication device 800 described above with reference to FIG. 8. In some implementations, the process 1700 may be performed by a wireless communication device operating as or within an AP, such as one of the APs 102 and 902 described above with reference to FIGS. 1 and 9A, respectively. In some implementations, the process 1700 may be performed by a wireless communication device operating as or within a STA, such as one of the STAs 104 and 904 described above with reference to FIGS. 1 and 9B, respectively.

In some implementations, the process 1700 begins in block 1710 with obtaining first data to transmit to a first wireless station of the WLAN based on a first generation of a wireless communication specification and second data to transmit to a second wireless station of the WLAN based on a second generation of the wireless communication specification.

In block 1720, the process 1700 proceeds with generating a first generation-specific preamble for a first subchannel of a wireless channel based on the first generation of a wireless communication specification.

In block 1730, the process 1700 proceeds with generating a second generation-specific preamble for a second subchannel of the wireless channel based on the second generation of wireless communication specification.

In block 1740, the process 1700 proceeds with applying a phase rotation to the second generation-specific preamble such that the second generation-specific preamble has a different phase rotation than the first generation-specific preamble.

In block 1750, the process 1700 proceeds with transmitting a multi-generation PPDU via the wireless channel that includes at least the first generation-specific preamble in the first subchannel, the second generation-specific preamble in the second subchannel, and one or more data fields for communicating the first data and the second data based on the first generation of wireless communication specification and the second generation of wireless communication specification, respectively.

Figure 18:
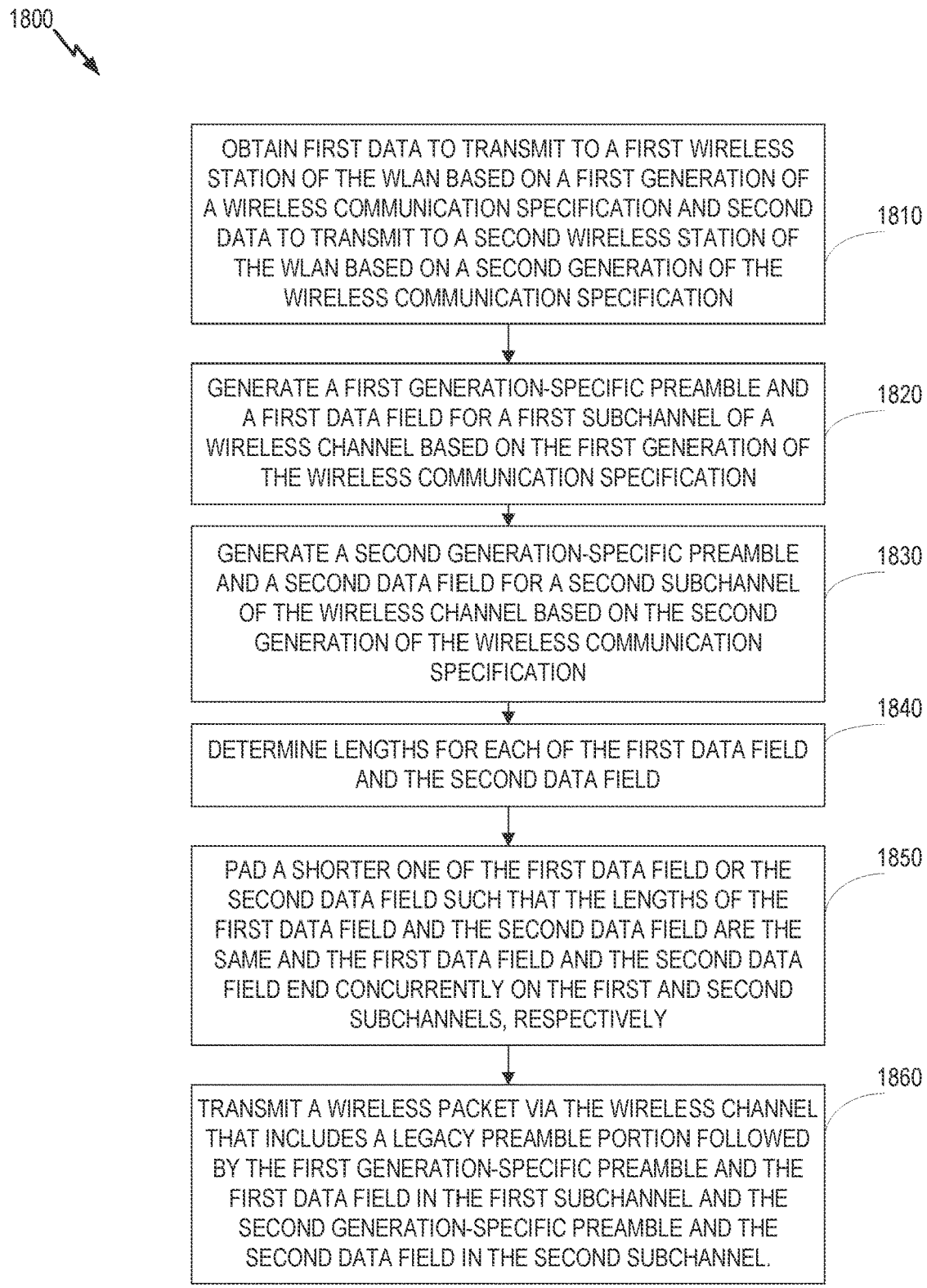
FIG. 18 shows a flowchart illustrating an example process for receiving a multi-generation PPDU with padding according to some implementations.

FIG. 18 shows a flowchart illustrating an example process 1800 for receiving a multi-generation PPDU with padding according to some implementations. The process 1800 may be performed by a wireless communication device such as the wireless communication device 800 described above with reference to FIG. 8. In some implementations, the process 1800 may be performed by a wireless communication device operating as or within an AP, such as one of the APs 102 and 902 described above with reference to FIGS. 1 and 9A, respectively. In some implementations, the process 1800 may be performed by a wireless communication device operating as or within a STA, such as one of the STAs 104 and 904 described above with reference to FIGS. 1 and 9B, respectively.

In some implementations, the process 1800 begins in block 1810 with obtaining first data to transmit to a first wireless station of the WLAN based on a first generation of wireless communication specification and second data to transmit to a second wireless station of the WLAN based on a second generation of wireless communication specification.

In block 1820, the process 1800 proceeds with generating a first generation-specific preamble and a first data field for a first subchannel of a wireless channel based on the first generation of wireless communication specification.

In block 1830, the process 1800 proceeds with generating a second generation-specific preamble and a second data field for a second subchannel of the wireless channel based on the second generation of wireless communication specification.

In block 1840, the process 1800 proceeds with determining lengths for each of the first data field and the second data field.

In block 1850, the process 1800 proceeds with padding a shorter one of the first data field or the second data field such that the lengths of the first data field and the second data field are the same and the first data field and the second data field end concurrently on the first and second subchannels, respectively.

In block 1860, the process 1800 proceeds with transmitting a multi-generation PPDU via the wireless channel that includes a legacy preamble portion followed by the first generation-specific preamble and the first data field in the first subchannel and the second generation-specific preamble and the second data field in the second subchannel.

Figure 19:
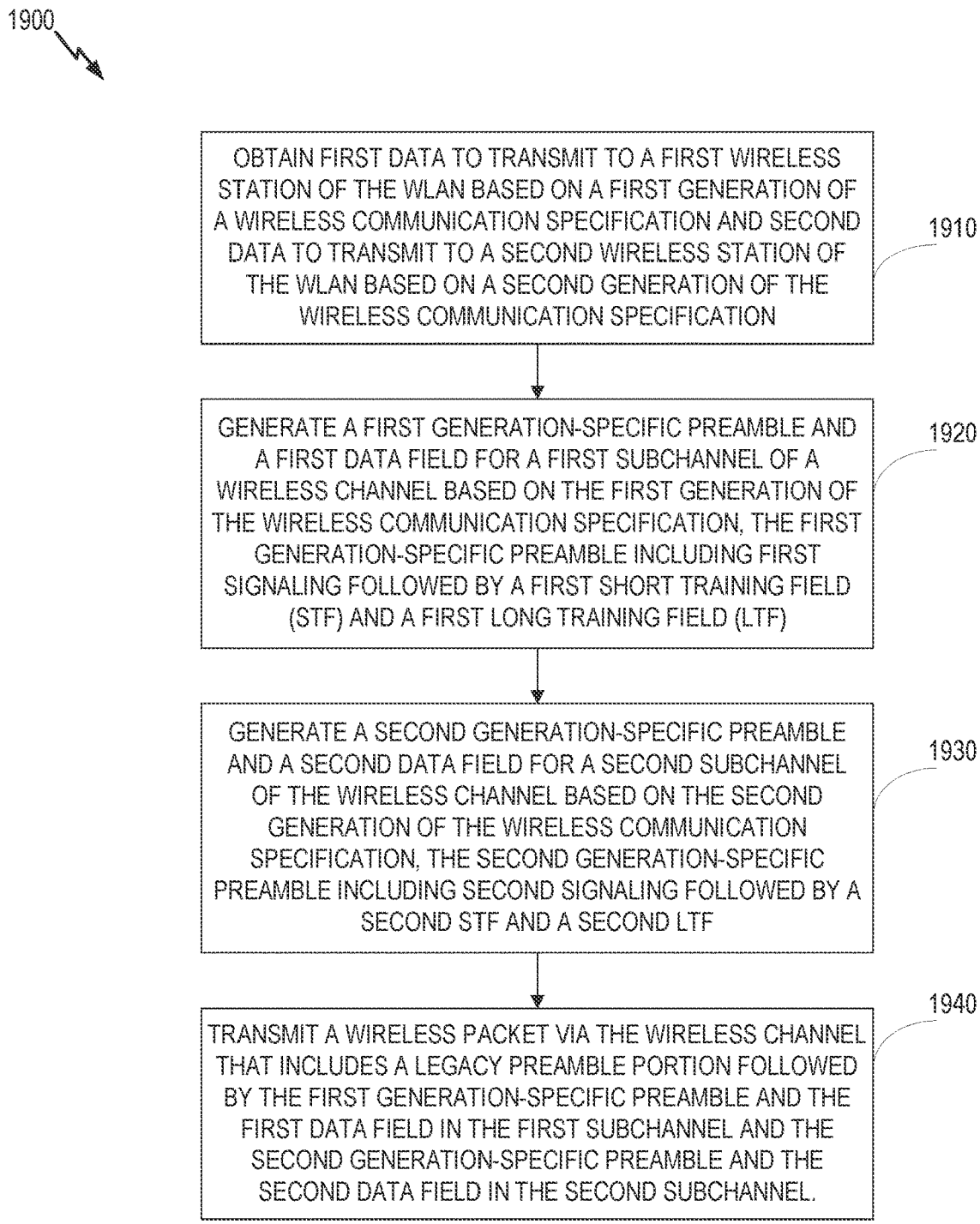
FIG. 19 shows a flowchart illustrating an example process for receiving a multi-generation PPDU with different STFs and LTFs based on different generations according to some implementations.

FIG. 19 shows a flowchart illustrating an example process 1900 for receiving a multi-generation PPDU with different STFs and LTFs based on different generations according to some implementations. The process 1900 may be performed by a wireless communication device such as the wireless communication device 800 described above with reference to FIG. 8. In some implementations, the process 1900 may be performed by a wireless communication device operating as or within an AP, such as one of the APs 102 and 902 described above with reference to FIGS. 1 and 9A, respectively. In some implementations, the process 1900 may be performed by a wireless communication device operating as or within a STA, such as one of the STAs 104 and 904 described above with reference to FIGS. 1 and 9B, respectively.

In some implementations, the process 1900 begins in block 1910 with obtaining first data to transmit to a first wireless station of the WLAN based on a first generation of a wireless communication specification and second data to transmit to a second wireless station of the WLAN based on a second generation of the wireless communication specification.

In block 1920, the process 1900 proceeds with generating a first generation-specific preamble and a first data field for a first subchannel of a wireless channel based on the first generation of the wireless communication specification, the first generation-specific preamble including first signaling followed by a first short training field (STF) and a first long training field (LTF).

In block 1930, the process 1900 proceeds with generating a second generation-specific preamble and a second data field for a second subchannel of the wireless channel based on the second generation of the wireless communication specification, the second generation-specific preamble including second signaling followed by a second STF and a second LTF.

In block 1940, the process 1900 proceeds with transmitting a multi-generation PPDU via the wireless channel that includes a legacy preamble portion followed by the first generation-specific preamble and the first data field in the first subchannel and the second generation-specific preamble and the second data field in the second subchannel.

Figure 20:
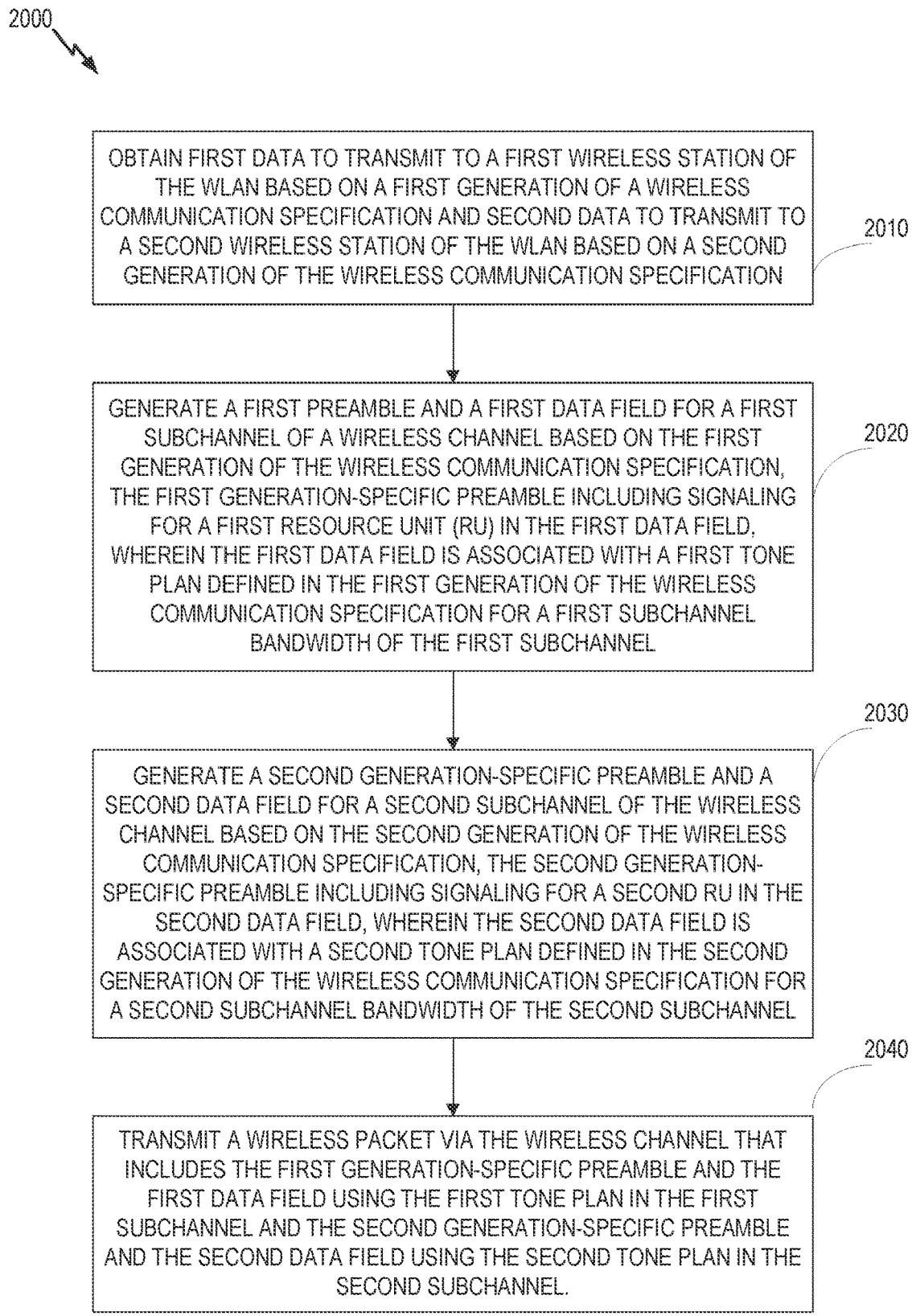
FIG. 20 shows a flowchart illustrating an example process for receiving a multi-generation PPDU using an updated tone plan according to some implementations.

FIG. 20 shows a flowchart illustrating an example process 2000 for receiving a multi-generation PPDU using an updated tone plan according to some implementations. The process 2000 may be performed by a wireless communication device such as the wireless communication device 800 described above with reference to FIG. 8. In some implementations, the process 2000 may be performed by a wireless communication device operating as or within an AP, such as one of the APs 102 and 902 described above with reference to FIGS. 1 and 9A, respectively. In some implementations, the process 2000 may be performed by a wireless communication device operating as or within a STA, such as one of the STAs 104 and 904 described above with reference to FIGS. 1 and 9B, respectively.

In some implementations, the process 2000 begins in block 2010 with obtaining first data to transmit to a first wireless station of the WLAN based on a first generation of a wireless communication specification and second data to transmit to a second wireless station of the WLAN based on a second generation of the wireless communication specification.

In block 2020, the process 2000 proceeds with generating a first generation-specific preamble and a first data field for a first subchannel of a wireless channel based on the first generation of the wireless communication specification, the first generation-specific preamble including signaling for a first resource unit (RU) in the first data field, wherein the first data field is associated with a first tone plan defined in the first generation of the wireless communication specification for a first subchannel bandwidth of the first subchannel.

In block 2030, the process 2000 proceeds with generating a second generation-specific preamble and a second data field for a second subchannel of the wireless channel based on the second generation of the wireless communication specification, the second generation-specific preamble including signaling for a second RU in the second data field, wherein the second data field is associated with a second tone plan defined in the second generation of the wireless communication specification for a second subchannel bandwidth of the second subchannel.

In block 2040, the process 2000 proceeds with transmitting a multi-generation PPDU via the wireless channel that includes the first generation-specific preamble and the first data field using the first tone plan in the first subchannel and the second generation-specific preamble and the second data field using the second tone plan in the second subchannel.

Figure 21:
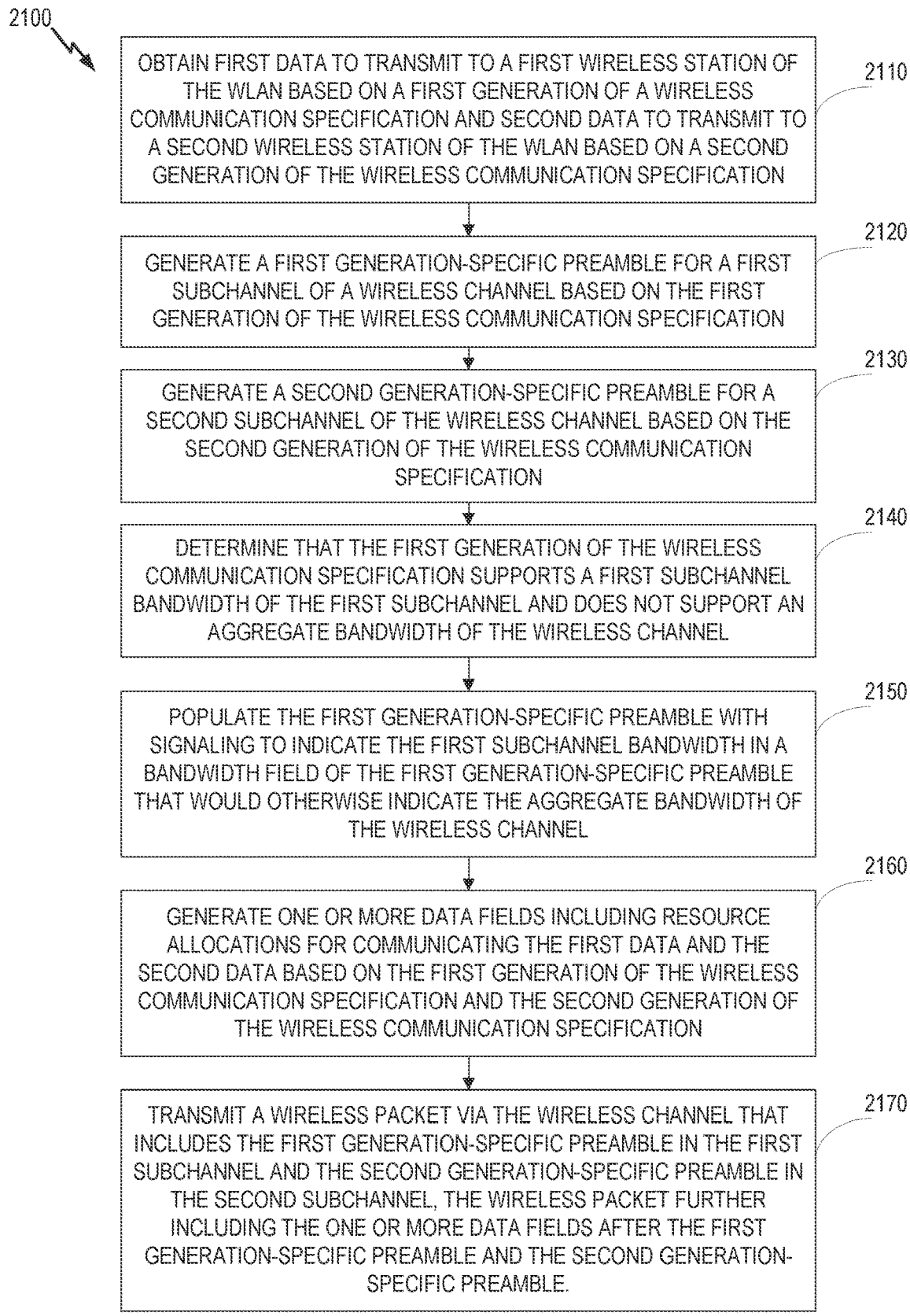
FIG. 21 shows a flowchart illustrating an example process for receiving a multi-generation PPDU with a spoofed bandwidth value according to some implementations.

FIG. 21 shows a flowchart illustrating an example process 2100 for receiving a multi-generation PPDU with a spoofed bandwidth value according to some implementations. In some implementations, an AP may populate a generation-specific preamble with a spoofed bandwidth value that is based on a subchannel bandwidth associated with a segment of the common data field rather than an actual bandwidth of the multi-generation PPDU. The process 2100 may be performed by a wireless communication device such as the wireless communication device 800 described above with reference to FIG. 8. In some implementations, the process 2100 may be performed by a wireless communication device operating as or within an AP, such as one of the APs 102 and 902 described above with reference to FIGS. 1 and 9A, respectively. In some implementations, the process 2100 may be performed by a wireless communication device operating as or within a STA, such as one of the STAs 104 and 904 described above with reference to FIGS. 1 and 9B, respectively.

In some implementations, the process 2100 begins in block 2110 with obtaining first data to transmit to a first wireless station of the WLAN based on a first generation of a wireless communication specification and second data to transmit to a second wireless station of the WLAN based on a second generation of the wireless communication specification.

In block 2120, the process 2100 proceeds with generating a first generation-specific preamble for a first subchannel of a wireless channel based on the first generation of the wireless communication specification.

In block 2130, the process 2100 proceeds with generating a second generation-specific preamble for a second subchannel of the wireless channel based on the second generation of the wireless communication specification.

In block 2140, the process 2100 proceeds with determining that the first generation supports a first subchannel bandwidth of the first subchannel and does not support an aggregate bandwidth of the wireless channel.

In block 2150, the process 2100 proceeds with populating the first generation-specific preamble with signaling to indicate the first subchannel bandwidth in a bandwidth field of the first generation-specific preamble that would otherwise indicate the aggregate bandwidth of the wireless channel.

In block 2160, the process 2100 proceeds with generating one or more data fields including resource allocations for communicating the first data and the second data based on the first generation and the second generation, respectively.

In block 2170, the process 2100 proceeds with transmitting a multi-generation PPDU via the wireless channel that includes the first generation-specific preamble in the first subchannel and the second generation-specific preamble in the second subchannel, the multi-generation PPDU further including the one or more data fields after the first generation-specific preamble and the second generation-specific preamble.

Figure 22:
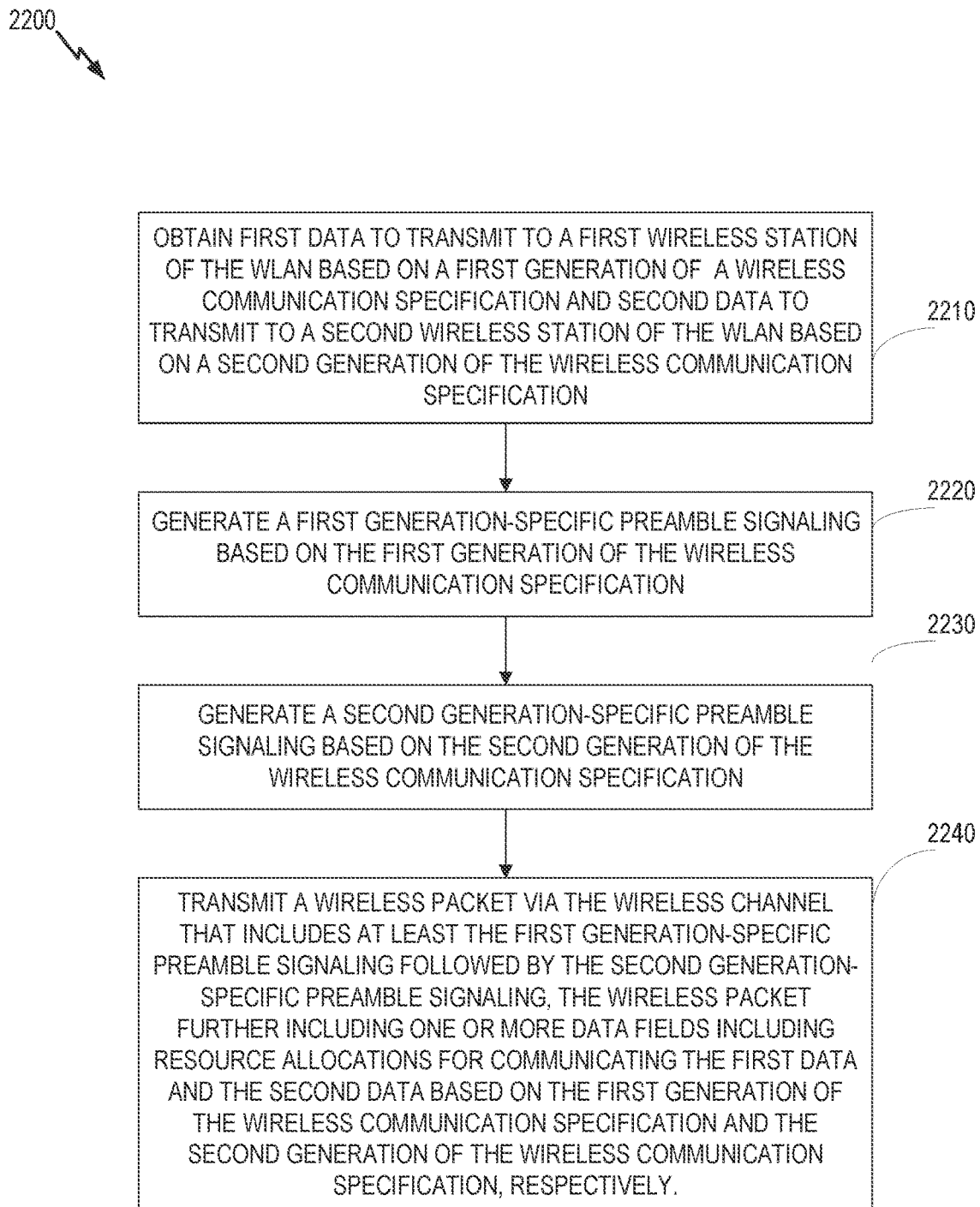
FIG. 22 shows a flowchart illustrating an example process for receiving a multi-generation PPDU with time division multiplexing of signaling fields according to some implementations.

FIG. 22 shows a flowchart illustrating an example process 2200 for receiving a multi-generation PPDU with time division multiplexing of signaling fields according to some implementations. The process 2200 may be performed by a wireless communication device such as the wireless communication device 800 described above with reference to FIG. 8. In some implementations, the process 2200 may be performed by a wireless communication device operating as or within an AP, such as one of the APs 102 and 902 described above with reference to FIGS. 1 and 9A, respectively. In some implementations, the process 2200 may be performed by a wireless communication device operating as or within a STA, such as one of the STAs 104 and 904 described above with reference to FIGS. 1 and 9B, respectively.

In some implementations, the process 2200 begins in block 2210 with obtaining first data to transmit to a first wireless station of the WLAN based on a first generation of a wireless communication specification and second data to transmit to a second wireless station of the WLAN based on a second generation of the wireless communication specification.

In block 2220, the process 2200 proceeds with generating a first generation-specific preamble signaling based on the first generation.

In block 2230, the process 2200 proceeds with generating a second generation-specific preamble signaling based on the second generation.

In block 2240, the process 2200 proceeds with transmitting a multi-generation PPDU via the wireless channel that includes at least the first generation-specific preamble signaling followed by the second generation-specific preamble signaling, the multi-generation PPDU further including one or more data fields including resource allocations for communicating the first data and the second data based on the first generation and the second generation, respectively.

Figure 23:
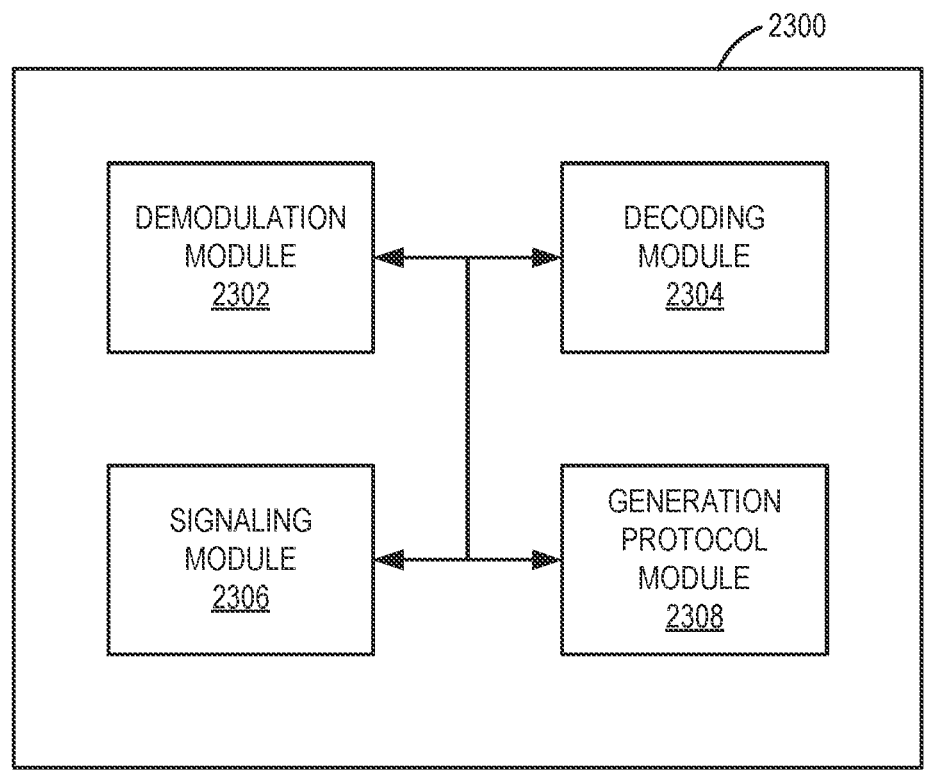
FIG. 23 shows a block diagram of an example wireless communication device according to some implementations.

FIG. 23 shows a block diagram of an example wireless communication device 2300 according to some implementations. In some implementations, the wireless communication device 2300 is configured to perform one or more of the processes described above. The wireless communication device 2300 may be an example implementation of the wireless communication device 800 described above with reference to FIG. 8. For example, the wireless communication device 2300 can be a chip, SoC, chipset, package or device that includes at least one processor and at least one modem (for example, a Wi-Fi (IEEE 802.11) modem or a cellular modem). In some implementations, the wireless communication device 2300 can be a device for use in an AP, such as one of the APs 102 and 902 described above with reference to FIGS. 1 and 9A, respectively. In some implementations, the wireless communication device 2300 can be a device for use in a STA, such as one of the STAs 104 and 904 described above with reference to FIGS. 1 and 9B, respectively. In some other implementations, the wireless communication device 2300 can be an AP or a STA that includes such a chip, SoC, chipset, package or device as well as at least one transmitter, at least one receiver, and at least one antenna.

The wireless communication device 2300 includes a demodulation module 2302, a decoding module 2304, a signaling module 2306 and a generation protocol module 2308. Portions of one or more of the modules 2302, 2304, 2306 and 2308 may be implemented at least in part in hardware or firmware. For example, the demodulation module 2302, the decoding module 2304, the signaling module 2306 and the generation protocol module 2308 may be implemented at least in part by a modem (such as the modem 802). In some implementations, portions of some of the modules 2302, 2304, 2306 or 2308 may be implemented at least in part as software stored in a memory (such as the memory 808). For example, portions of one or more of the modules 2302, 2304, 2306 or 2308 can be implemented as non-transitory instructions (or "code") executable by a processor (such as the processor 806) to perform the functions or operations of the respective module.

The demodulation module 2302 is configured to receive at least part of a multi-generation PPDU according to the generation of wireless communication specification implemented by the generation protocol module 2308. The demodulation module 2302 is configured to demodulate the symbols in the received packet and to determine the modulation scheme that was used to module the symbols. The decoding module 2304 is configured to decode the bits in the demodulated symbols and to interpret bits in the decoded bits based on a wireless communication specification.

The signaling module 2306 is configured to interpret signal fields of a generation-specific preamble in the multi-generation PPDU in accordance with the implementations described above. The generation protocol module 2308 is configured to receive and process at least part of a multi-generation PPDU according to a generation of the wireless communication specification supported by the wireless communication device 2300.

Figure 24:
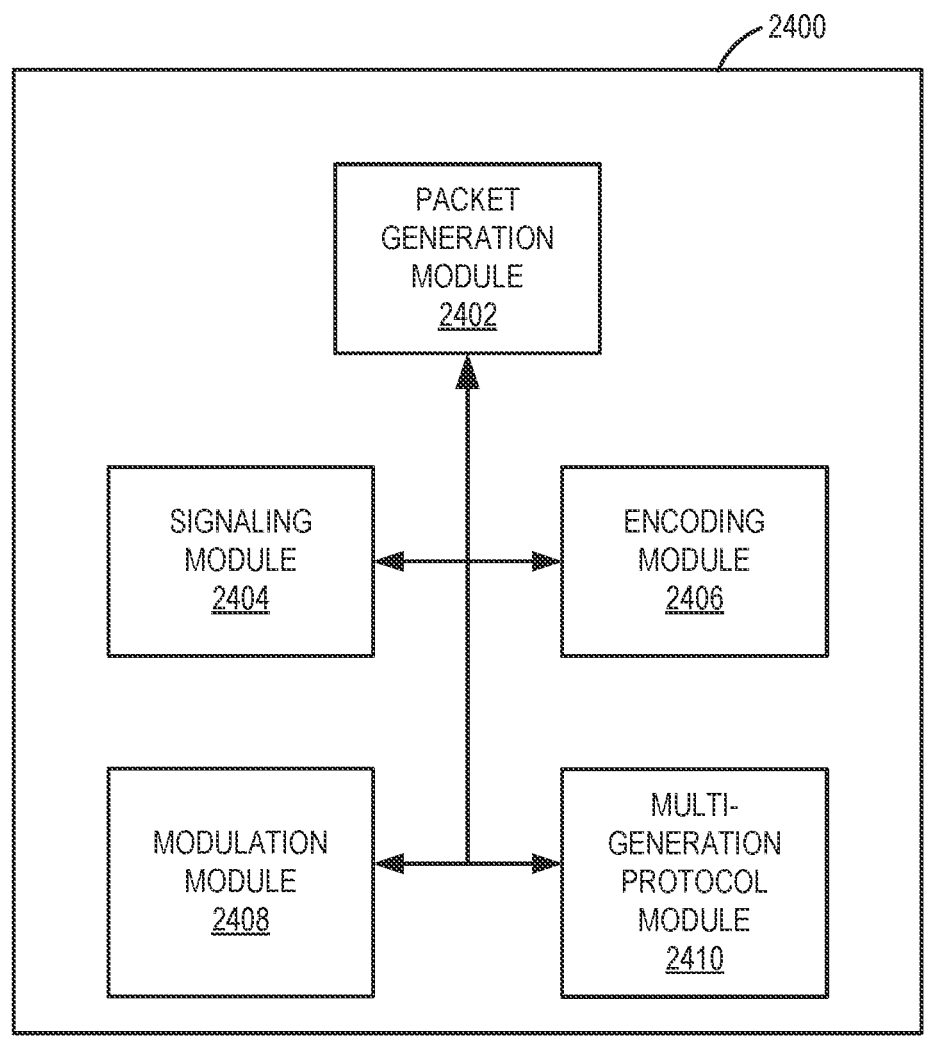
FIG. 24 shows a block diagram of an example wireless communication device according to some implementations.

FIG. 24 shows a block diagram of an example wireless communication device 2400 according to some implementations. In some implementations, the wireless communication device 2400 is configured to perform one or more of the processes described above. The wireless communication device 2400 may be an example implementation of the wireless communication device 800 described above with reference to FIG. 8. For example, the wireless communication device 2400 can be a chip, SoC, chipset, package or device that includes at least one processor and at least one modem (for example, a Wi-Fi (IEEE 802.11) modem or a cellular modem). In some implementations, the wireless communication device 2400 can be a device for use in an AP, such as one of the APs 102 and 902 described above with reference to FIGS. 1 and 9A, respectively. In some implementations, the wireless communication device 2400 can be a device for use in a STA, such as one of the STAs 104 and 904 described above with reference to FIGS. 1 and 9B, respectively. In some other implementations, the wireless communication device 2400 can be an AP or a STA that includes such a chip, SoC, chipset, package or device as well as at least one transmitter, at least one receiver, and at least one antenna.

The wireless communication device 2400 includes a packet generation module 2402, a signaling module 2404, an encoding module 2406, a modulation module 2408 and a multi-generation protocol module 2410. Portions of one or more of the modules 2402, 2404, 2406, 2408 and 2410 may be implemented at least in part in hardware or firmware. For example, the packet generation module 2402, the signaling module 2404, the encoding module 2406, the modulation module 2408 and the multi-generation protocol module 2410 may be implemented at least in part by a modem (such as the modem 802). In some implementations, portions of some of the modules 2402, 2404, 2406, 2408 or 2410 may be implemented at least in part as software stored in a memory (such as the memory 808). For example, portions of one or more of the modules 2402, 2404, 2406 or 2408 can be implemented as non-transitory instructions (or "code") executable by a processor (such as the processor 806) to perform the functions or operations of the respective module.

The packet generation module 2402 is configured to generate a multi-generation PPDU according to any of the examples described herein. The signaling module 2404 is configured to prepare signal fields for the PPDU in accordance with the implementations described above. For example, the signaling module 2404 may prepare the generation-specific signaling to include in a generation-specific preamble. The modulation module 2408 is configured to modulate the symbols in the generated PPDU. The multi-generation protocol module 2410 is configured to implement one or more generations of a wireless communication specification.

Figure 25:
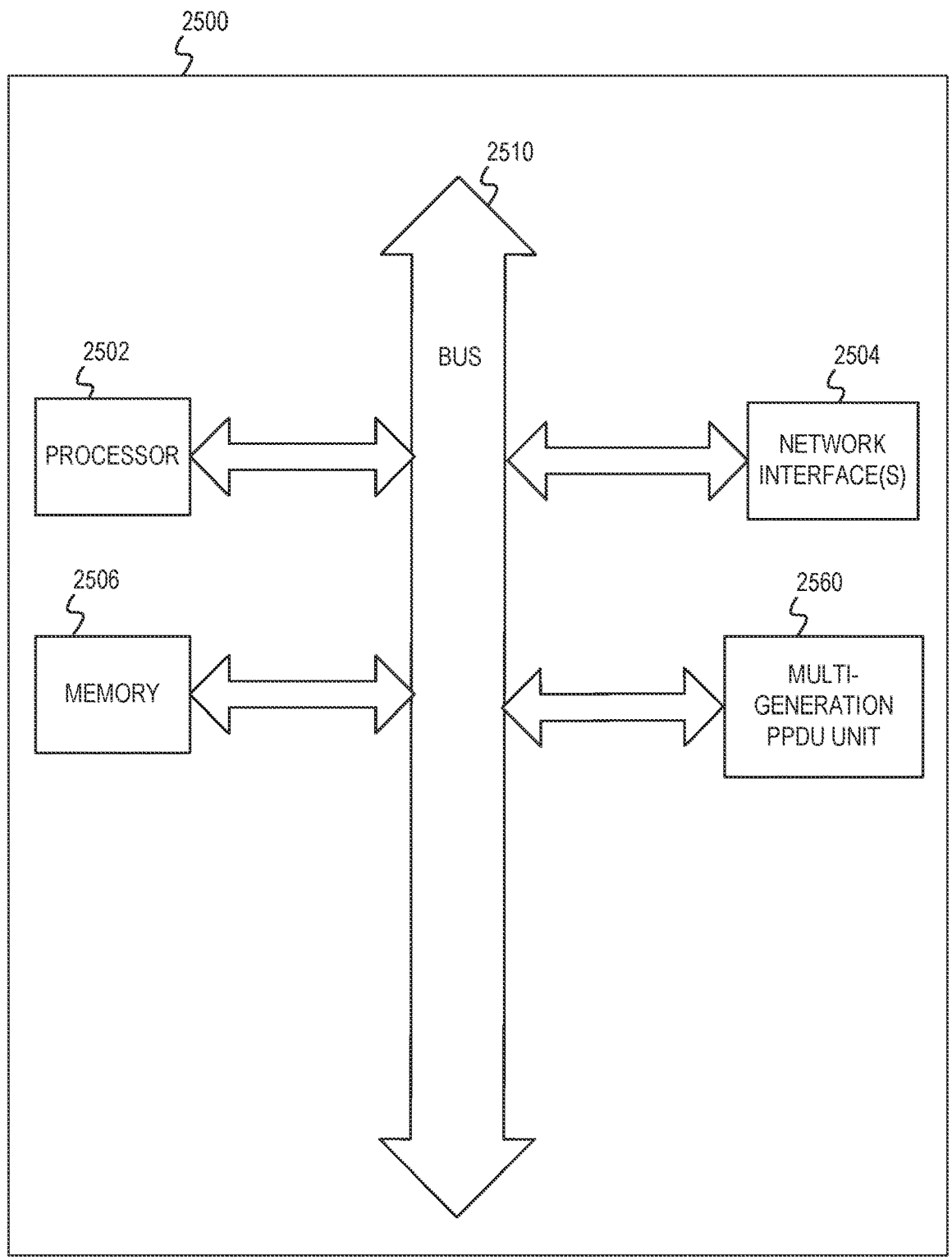
FIG. 25 shows a block diagram of an example electronic device.

FIG. 25 shows a block diagram of an example electronic device. In some implementations, the electronic device 2500 may be one of an access point (including any of the APs described herein), a range extender, or other electronic systems. The electronic device 2500 can include a processor 2502 (possibly including multiple processors, multiple cores, multiple nodes, or implementing multi-threading, etc.). The electronic device 2500 also can include a memory 2506. The memory 2506 may be system memory or any one or more of the possible realizations of computer-readable media described herein. The electronic device 2500 also can include a bus 2510 (such as PCI, ISA, PCI-Express, Hyper-Transport®, InfiniBand®, NuBus,® AHB, AXI, etc.), and a network interface 2504 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2500 may support multiple network interfaces—each of which is configured to couple the electronic device 2500 to a different communication network.

The electronic device 2500 may include a multi-generation PPDU unit 2560. In some implementations, the multi-generation PPDU unit 2560 may be distributed within the processor 2502, the memory 2506, and the bus 2510. The multi-generation PPDU unit 2560 may perform some or all of the operations described herein. For example, the multi-generation PPDU unit 2560 may generate a multi-generation PPDU according to any of the examples herein. Alternatively, or additionally, the multi-generation PPDU unit 2560 may be configured to receive and process at least part of a multi-generation PPDU.

The memory 2506 can include computer instructions executable by the processor 2502 to implement the functionality of the implementations described in FIGS. 1-21. Any of these functionalities may be partially (or entirely) implemented in hardware or on the processor 2502. For example, the functionality may be implemented with an application-specific integrated circuit, in logic implemented in the processor 2502, in a co-processor on a peripheral device or card, etc. Further, realizations may include fewer or additional components not illustrated in FIG. 24 (such as video cards, audio cards, additional network interfaces, peripheral devices, etc.). The processor 2502, the memory 2506, and the network interface 2504 may be coupled to the bus 2510. Although illustrated as being coupled to the bus 2510, the memory 2506 may be coupled to the processor 2502.

FIGS. 1-25 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing examples are based on frequency multiplexing generation-specific preambles into various subchannels. In some aspects, a multi-generation PPDU may use time multiplexing rather than (or in addition to) frequency multiplexing. While many of the examples in this disclosure are based on frequency multiplexing different generation-specific preambles based on subchannels, the concepts may be applied to time multiplexing the generation-specific preambles. For example, the AP may transmit a multi-generation PPDU that includes at least the first generation-specific preamble signaling field followed by a second generation-specific preamble signaling field. For example, the multi-generation PPDU may be formatted to include a universal signal (U-SIG) field followed by an Extremely High Throughput (EHT) signal (EHT-SIG) field defined in IEEE 802.11be, which is then followed by a next generation signal field based on a next generation of the IEEE 802.11 standard after IEEE 802.11be. In some implementations, the U-SIG field may indicate a quantity of generation-specific signaling fields in the multi-generation PPDU. A wireless station based on IEEE 802.11be may interpret the EHT-SIG field and then skip over or disregard a portion of the preamble that includes the next generation signal field. A similar approach could be used for the generation-specific STF and LTF that typically follow the signal fields and precede the data field. Alternatively, if two or more generations use a same sequence for the generation-specific STF and LTF, the multi-generation PPDU may include only one copy of the STF and LTF before the data field.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for reference).

Clauses

Clause 1. A method for wireless communication by an apparatus of a wireless local area network (WLAN), including: generating a first generation-specific preamble formatted according to a first generation of a wireless communication specification based on a first bandwidth of a first subchannel of the wireless channel; generating a second generation-specific preamble formatted according to a second generation of the wireless communication specification based on a second bandwidth of a second subchannel of the wireless channel; generating a multi-generation physical layer protocol data unit (PPDU) that concurrently includes the first generation-specific preamble in the first subchannel and the second generation-specific preamble in the second subchannel; modifying at least the first generation-specific preamble or the second generation-specific preamble based on an aggregate bandwidth of the multi-generation PPDU; and transmitting the multi-generation PPDU via the wireless channel.

Clause 2. The method of clause 1, where modifying at least the first generation-specific preamble or the second generation-specific preamble includes applying a phase rotation to the second generation-specific preamble such that the second generation-specific preamble has a different phase than the first generation-specific preamble.

Clause 3. The method of clause 2, where the phase rotation is configured to reduce a peak-to-average-power ratio (PAPR) of a preamble portion of the multi-generation PPDU as compared to that which would be associated with the multi-generation PPDU without the phase rotation applied to the second generation-specific preamble.

Clause 4. The method of clause 2, further including: determining the phase rotation based on an aggregate bandwidth of the multi-generation PPDU.

Clause 5. The method of clause 2, where the phase rotation is a 90 degree, 180 degree, or 270 degree phase rotation.

Clause 6. The method clause 1, where modifying at least the first generation-specific preamble or the second generation-specific preamble includes: applying sub-preamble phase rotations to respective sub-preamble portions of the second generation-specific preamble in accordance with a phase rotation scheme of the second generation of the wireless communication protocol, the phase rotation scheme based on a subchannel bandwidth of the second subchannel; and applying a further phase rotation to the second generation-specific preamble based on an aggregate bandwidth of the wireless channel.

Clause 7. The method of clause 1, further including: generating a plurality of generation-specific preambles including the first generation-specific preamble and the second generation-specific preamble, each generation-specific preamble for use in a different subchannel of the wireless channel as part of the multi-generation PPDU; and applying one or more phase rotations to one or more of the plurality of generation-specific preambles such that each generation-specific preamble has a different phase rotation than that of a generation-specific preamble in an adjacent subchannel.

Clause 8. The method of clause 1, where modifying at least the first generation-specific preamble or the second generation-specific preamble includes: generating a first data field to follow the first generation-specific preamble in the first subchannel; generating a second data field to follow the second generation-specific preamble in the second subchannel; and transmitting the multi-generation PPDU having the first data field following the first generation-specific preamble in the first subchannel and the second data field following the second generation-specific preamble in the second subchannel such that the first data field and the second data field end concurrently in the first and second subchannels, respectively.

Clause 9. The method of clause 8, further including: padding a shorter one of the first data field and the second data field such that a length or duration of the first data field is a same as a length or duration of the second data field.

Clause 10. The method of clause 8, further including: including a legacy preamble in the multi-generation PPDU, the legacy preamble including a legacy length field having a first length value in the first subchannel and a second length value in the second subchannel, where the first length value and the second length value are based on the first generation and second generation, respectively.

Clause 11. The method of clause 10, where the first and second length values are determined based on a multi-user (MU) PPDU packet format defined for the first generation and the second generation, respectively, and where the first generation and the second generation define different formulas for determining the legacy length field such that the first length value and the second length value are different values but represent a same length or duration of the multi-generation PPDU.

Clause 12. The method of clause 11, where the first generation is based on Institute of Electrical and Electronics Engineers (IEEE) 802.11ax amendment to IEEE 802.11 standard and the first length value is set such that a modulo three of the first length value is equal to 2, and where the second generation is based on IEEE 802.11be amendment to IEEE 802.11 standard and the second length value is set such that a modulo three of the first length value is equal to 0.

Clause 13. The method of clause 1, where the first generation-specific preamble includes first signaling followed by a first short training field (STF) and a first long training field (LTF), where the second generation-specific preamble includes second signaling followed by a second STF and a second LTF, and where the first LTF and the second LTF are generated using a common orthogonal frequency division multiplexing (OFDM) symbol configuration such that the first LTF and the second LTF are aligned in time on symbol boundaries.

Clause 14. The method of clause 13, further including: determining the common OFDM symbol configuration based on an aggregate bandwidth of the multi-generation PPDU.

Clause 15. The method of clause 13, further including: determining sequences for the first STF and the first LTF based on a first bandwidth of the first subchannel; and determining sequences for the second STF and the second LTF based on a second bandwidth of the second subchannel.

Clause 16. The method of clause 13, where modifying at least the first generation-specific preamble or the second generation-specific preamble includes: applying a phase rotation to at least the second STF and the second LTF such that the second STF and second LTF have a different phase than the first STF and the first LTF.

Clause 17. The method of clause 13, where modifying at least the first generation-specific preamble or the second generation-specific preamble includes: generating the first STF and the first LTF using a first tone plan based on an aggregate bandwidth of the multi-generation PPDU, where sequences for the first STF and the first LTF are based on a first bandwidth of the first subchannel.

Clause 18. The method of clause 1, where modifying at least the first generation-specific preamble or the second generation-specific preamble includes: applying a first cyclic shift diversity (CSD) to at least part of the second generation-specific preamble such that the part of the second generation-specific preamble has a different CSD than a corresponding part of the first generation-specific preamble.

Clause 19. The method of clause 18, where the first CSD is configured to reduce a total peak-to-average-power ratio (PAPR) of the multi-generation PPDU as compared to that which would be associated with the multi-generation PPDU without applying the first CSD to the second generation-specific preamble.

Clause 20. The method of clause 1, further including: allocating one or more resource units (RUs) of a first data field based on a first tone plan associated with a first bandwidth of the first subchannel according to the first generation of the wireless communication protocol; allocating one or more other RUs of a second data field based on a second tone plan associated with a second bandwidth of the second subchannel according to the second generation of the wireless communication protocol; and transmitting the multi-generation PPDU having the first data field using the first tone plan following the first generation-specific preamble in the first subchannel and the second data field using the second tone plan following the second generation-specific preamble in the second subchannel.

Clause 21. The method of clause 1, where modifying at least the first generation-specific preamble or the second generation-specific preamble includes: populating a PPDU bandwidth field of the first generation-specific preamble or the second generation-specific preamble to indicate a first bandwidth of the first subchannel or a second bandwidth of the second subchannel, respectively, rather than a PPDU bandwidth size of the multi-generation PPDU.

Clause 22. The method of clause 1, where modifying at least the first generation-specific preamble or the second generation-specific preamble includes: indicating, in the first generation-specific preamble or the second generation-specific preamble, both an aggregate bandwidth of the multi-generation PPDU and a bandwidth of the first subchannel or the second subchannel, respectively.

Clause 23. An apparatus for wireless communication via a wireless local area network (WLAN), including: at least one processor configured to: generate a first generation-specific preamble formatted according to a first generation of a wireless communication specification based on a first bandwidth of a first subchannel of the wireless channel; generate a second generation-specific preamble formatted according to a second generation of the wireless communication specification based on a second bandwidth of a second subchannel of the wireless channel; generate a multi-generation physical layer protocol data unit (PPDU) that concurrently includes the first generation-specific preamble in the first subchannel and the second generation-specific preamble in the second subchannel; modify at least the first generation-specific preamble or the second generation-specific preamble based on an aggregate bandwidth of the multi-generation PPDU; and at least one modem configured to output the multi-generation PPDU for transmission via the wireless channel.

Clause 24. The apparatus of clause 23, where the at least one processor is configured to apply a phase rotation to the second generation-specific preamble such that the second generation-specific preamble has a different phase than the first generation-specific preamble.

Clause 25. The apparatus of clause 24, where the phase rotation is configured to reduce a peak-to-average-power ratio (PAPR) of a preamble portion of the multi-generation PPDU as compared to that which would be associated with the multi-generation PPDU without the phase rotation applied to the second generation-specific preamble.

Clause 26. The apparatus of clause 24, where the at least one processor is configured to determine the phase rotation based on an aggregate bandwidth of the multi-generation PPDU.

Clause 27. The apparatus of clause 23, where the at least one processor is configured to: generate a plurality of generation-specific preambles including the first generation-specific preamble and the second generation-specific preamble, each generation-specific preamble for use in a different subchannel of the wireless channel as part of the multi-generation PPDU; and apply one or more phase rotations to one or more of the plurality of generation-specific preambles such that each generation-specific preamble has a different phase rotation than that of a generation-specific preamble in an adjacent subchannel.

Clause 28. The apparatus of clause 23, where the at least one processor is configured to: generate the first generation-specific preamble to include first signaling followed by a first short training field (STF) and a first long training field (LTF), generate the second generation-specific preamble to include second signaling followed by a second STF and a second LTF, and generate the first LTF and the second LTF using a common orthogonal frequency division multiplexing (OFDM) symbol configuration such that the first LTF and the second LTF are aligned in OFDM symbols of the multi-generation PPDU.

Clause 29. The apparatus of clause 28, where the at least one processor is configured to: determine the common OFDM symbol configuration based on an aggregate bandwidth of the multi-generation PPDU; generate sequences for the first STF and the first LTF based on a first bandwidth of the first subchannel; and generate sequences for the second STF and the second LTF based on a second bandwidth of the second subchannel.

Clause 30. The apparatus of clause 23, where the at least one processor is configured to apply a first cyclic shift diversity (CSD) to at least part of the second generation-specific preamble such that the part of the second generation-specific preamble has a different CSD than a corresponding part of the first generation-specific preamble.

Clause 31. The apparatus of clause 23, where the at least one processor is configured to populate a PPDU bandwidth field of the first generation-specific preamble or the second generation-specific preamble to indicate a first bandwidth of the first subchannel or a second bandwidth of the second subchannel, respectively, rather than a PPDU bandwidth size of the multi-generation PPDU.

Clause 32. The apparatus of clause 23, further including: at least one memory communicatively coupled with the at least one processor and storing processor-readable code; at least one transceiver coupled to the at least one modem; at least one antenna coupled to the at least one transceiver to wirelessly transmit signals output from the at least one transceiver and to wirelessly receive signals for input into the at least one transceiver; and a housing that encompasses the at least one modem, the at least one processor, the at least one memory, the at least one transceiver and at least a portion of the at least one antenna.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module that may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication by an apparatus of a wireless local area network (WLAN), comprising:
generating a first generation-specific preamble formatted according to a first generation of a wireless communication specification based on a first bandwidth of a first subchannel of a wireless channel;
generating a second generation-specific preamble formatted according to a second generation of the wireless communication specification based on a second bandwidth of a second subchannel of the wireless channel;

generating a multi-generation physical layer protocol data unit (PPDU) that concurrently includes the first generation-specific preamble in the first subchannel and the second generation-specific preamble in the second subchannel;
modifying at least the first generation-specific preamble or the second generation-specific preamble based on an aggregate bandwidth of the multi-generation PPDU; and
transmitting the multi-generation PPDU via the wireless channel.

2. The method of claim 1, wherein modifying at least the first generation-specific preamble or the second generation-specific preamble includes applying a phase rotation to the second generation-specific preamble such that the second generation-specific preamble has a different phase than the first generation-specific preamble.

3. The method of claim 2, wherein the phase rotation is configured to reduce a peak-to-average-power ratio (PAPR) of a preamble portion of the multi-generation PPDU as compared to that which would be associated with the multi-generation PPDU without the phase rotation applied to the second generation-specific preamble.

4. The method of claim 2, further comprising:
determining the phase rotation based on the aggregate bandwidth of the multi-generation PPDU.

5. The method of claim 2, wherein the phase rotation is a 90 degree, 180 degree, or 270 degree phase rotation.

6. The method of claim 1, wherein modifying at least the first generation-specific preamble or the second generation-specific preamble includes:
applying sub-preamble phase rotations to respective sub-preamble portions of the second generation-specific preamble in accordance with a phase rotation scheme of the second generation of the wireless communication specification, the phase rotation scheme based on a subchannel bandwidth of the second subchannel; and
applying a further phase rotation to the second generation-specific preamble based on an aggregate bandwidth of the wireless channel.

7. The method of claim 1, further comprising:
generating a plurality of generation-specific preambles including the first generation-specific preamble and the second generation-specific preamble, each generation-specific preamble for use in a different subchannel of the wireless channel as part of the multi-generation PPDU; and
applying one or more phase rotations to one or more of the plurality of generation-specific preambles such that each generation-specific preamble has a different phase rotation than that of a generation-specific preamble in an adjacent subchannel.

8. The method of claim 1, wherein modifying at least the first generation-specific preamble or the second generation-specific preamble includes:
generating a first data field to follow the first generation-specific preamble in the first subchannel;
generating a second data field to follow the second generation-specific preamble in the second subchannel; and
transmitting the multi-generation PPDU having the first data field following the first generation-specific preamble in the first subchannel and the second data field following the second generation-specific preamble in the second subchannel such that the first data field and the second data field end concurrently in the first and second subchannels, respectively.

9. The method of claim 8, further comprising:
padding a shorter one of the first data field and the second data field such that a length or duration of the first data field is the same as a length or duration of the second data field.

10. The method of claim 8, further comprising:
including a legacy preamble in the multi-generation PPDU, the legacy preamble including a legacy length field having a first length value in the first subchannel and a second length value in the second subchannel, wherein the first length value and the second length value are based on the first generation and second generation, respectively.

11. The method of claim 10,
wherein the first and second length values are determined based on a multi-user (MU) PPDU packet format defined for the first generation and the second generation, respectively, and
wherein the first generation and the second generation define different formulas for determining the legacy length field such that the first length value and the second length value are different values but represent a same length or duration of the multi-generation PPDU.

12. The method of claim 11,
wherein the first generation is based on Institute of Electrical and Electronics Engineers (IEEE) 802.11ax amendment to IEEE 802.11 standard and the first length value is set such that a modulo three of the first length value is equal to 2, and
wherein the second generation is based on IEEE 802.11be amendment to IEEE 802.11 standard and the second length value is set such that a modulo three of the first length value is equal to 0.

13. The method of claim 1,
wherein the first generation-specific preamble includes first signaling followed by a first short training field (STF) and a first long training field (LTF),
wherein the second generation-specific preamble includes second signaling followed by a second STF and a second LTF, and
wherein the first LTF and the second LTF are generated using a common orthogonal frequency division multiplexing (OFDM) symbol configuration such that the first LTF and the second LTF are aligned in time on symbol boundaries.

14. The method of claim 13, further comprising:
determining the common OFDM symbol configuration based on the aggregate bandwidth of the multi-generation PPDU.

15. The method of claim 13, further comprising:
determining sequences for the first STF and the first LTF based on a first bandwidth of the first subchannel; and
determining sequences for the second STF and the second LTF based on a second bandwidth of the second subchannel.

16. The method of claim 13, wherein modifying at least the first generation-specific preamble or the second generation-specific preamble includes:
applying a phase rotation to at least the second STF and the second LTF such that the second STF and second LTF have a different phase than the first STF and the first LTF.

17. The method of claim 13, wherein modifying at least the first generation-specific preamble or the second generation-specific preamble includes:
generating the first STF and the first LTF using a first tone plan based on the aggregate bandwidth of the multi-generation PPDU, wherein sequences for the first STF and the first LTF are based on a first bandwidth of the first subchannel.

18. The method of claim 1, wherein modifying at least the first generation-specific preamble or the second generation-specific preamble includes:
applying a first cyclic shift diversity (CSD) to at least part of the second generation-specific preamble such that the part of the second generation-specific preamble has a different CSD than a corresponding part of the first generation-specific preamble.

19. The method of claim 18, wherein the first CSD is configured to reduce a total peak-to-average-power ratio (PAPR) of the multi-generation PPDU as compared to that which would be associated with the multi-generation PPDU without applying the first CSD to the second generation-specific preamble.

20. The method of claim 1, further comprising:
allocating one or more resource units (RUs) of a first data field based on a first tone plan associated with a first bandwidth of the first subchannel according to the first generation of the wireless communication specification;
allocating one or more other RUs of a second data field based on a second tone plan associated with a second bandwidth of the second subchannel according to the second generation of the wireless communication specification; and
transmitting the multi-generation PPDU having the first data field using the first tone plan following the first generation-specific preamble in the first subchannel and the second data field using the second tone plan following the second generation-specific preamble in the second subchannel.

21. The method of claim 1, wherein modifying at least the first generation-specific preamble or the second generation-specific preamble includes:
populating a PPDU bandwidth field of the first generation-specific preamble or the second generation-specific preamble to indicate a first bandwidth of the first subchannel or a second bandwidth of the second subchannel, respectively, rather than a PPDU bandwidth size of the multi-generation PPDU.

22. The method of claim 1, wherein modifying at least the first generation-specific preamble or the second generation-specific preamble includes:
indicating, in the first generation-specific preamble or the second generation-specific preamble, both the aggregate bandwidth of the multi-generation PPDU and a bandwidth of the first subchannel or the second subchannel, respectively.

23. An apparatus for wireless communication via a wireless local area network (WLAN), comprising:
at least one processor configured to:
generate a first generation-specific preamble formatted according to a first generation of a wireless communication specification based on a first bandwidth of a first subchannel of a wireless channel;
generate a second generation-specific preamble formatted according to a second generation of the wireless communication specification based on a second bandwidth of a second subchannel of the wireless channel;
generate a multi-generation physical layer protocol data unit (PPDU) that concurrently includes the first generation-specific preamble in the first subchannel and the second generation-specific preamble in the second subchannel; and
modify at least the first generation-specific preamble or the second generation-specific preamble based on an aggregate bandwidth of the multi-generation PPDU; and
at least one modem configured to output the multi-generation PPDU for transmission via the wireless channel.

24. The apparatus of claim 23, wherein the at least one processor is configured to apply a phase rotation to the second generation-specific preamble such that the second generation-specific preamble has a different phase than the first generation-specific preamble.

25. The apparatus of claim 24, wherein the phase rotation is configured to reduce a peak-to-average-power ratio (PAPR) of a preamble portion of the multi-generation PPDU as compared to that which would be associated with the multi-generation PPDU without the phase rotation applied to the second generation-specific preamble.

26. The apparatus of claim 24, wherein the at least one processor is configured to determine the phase rotation based on the aggregate bandwidth of the multi-generation PPDU.

27. The apparatus of claim 23, wherein the at least one processor is configured to:
generate a plurality of generation-specific preambles including the first generation-specific preamble and the second generation-specific preamble, each generation-specific preamble for use in a different subchannel of the wireless channel as part of the multi-generation PPDU; and
apply one or more phase rotations to one or more of the plurality of generation-specific preambles such that each generation-specific preamble has a different phase rotation than that of a generation-specific preamble in an adjacent subchannel.

28. The apparatus of claim 23, wherein the at least one processor is configured to:
generate the first generation-specific preamble to include first signaling followed by a first short training field (STF) and a first long training field (LTF),
generate the second generation-specific preamble to include second signaling followed by a second STF and a second LTF, and
generate the first LTF and the second LTF using a common orthogonal frequency division multiplexing (OFDM) symbol configuration such that the first LTF and the second LTF are aligned in OFDM symbols of the multi-generation PPDU.

29. The apparatus of claim 28, wherein the at least one processor is configured to:
determine the common OFDM symbol configuration based on the aggregate bandwidth of the multi-generation PPDU;
generate sequences for the first STF and the first LTF based on a first bandwidth of the first subchannel; and
generate sequences for the second STF and the second LTF based on a second bandwidth of the second subchannel.

30. The apparatus of claim 23, wherein the at least one processor is configured to apply a first cyclic shift diversity (CSD) to at least part of the second generation-specific preamble such that the part of the second generation-specific preamble has a different CSD than a corresponding part of the first generation-specific preamble.

31. The apparatus of claim 23, wherein the at least one processor is configured to populate a PPDU bandwidth field of the first generation-specific preamble or the second generation-specific preamble to indicate a first bandwidth of the first subchannel or a second bandwidth of the second subchannel, respectively, rather than a PPDU bandwidth size of the multi-generation PPDU.

32. The apparatus of claim 23, further comprising:
- at least one memory communicatively coupled with the at least one processor and storing processor-readable code;
- at least one transceiver coupled to the at least one modem;
- at least one antenna coupled to the at least one transceiver to wirelessly transmit signals output from the at least one transceiver and to wirelessly receive signals for input into the at least one transceiver; and
- a housing that encompasses the at least one modem, the at least one processor, the at least one memory, the at least one transceiver and at least a portion of the at least one antenna.

\* \* \* \* \*